(12) United States Patent
Straka et al.

(10) Patent No.: US 10,354,554 B2
(45) Date of Patent: Jul. 16, 2019

(54) USER INTERFACE FOR SYSTEM TO PROMOTE OPTIMUM PERFORMANCE OF HANDHELD COSMETIC DEVICE

(71) Applicant: L'OREAL, Paris (FR)

(72) Inventors: Scott Straka, Kirkland, WA (US); Daniel Bayeh, Seattle, WA (US); Jeffrey Kissinger, Kirkland, WA (US)

(73) Assignee: L'OREAL, Paris (FR)

( * ) Notice: Subject to any disclaimer, the term of this patent is extended or adjusted under 35 U.S.C. 154(b) by 88 days.

(21) Appl. No.: 15/193,616

(22) Filed: Jun. 27, 2016

(65) Prior Publication Data

US 2017/0372634 A1    Dec. 28, 2017

(51) Int. Cl.

| | | |
|---|---|---|
| *A46B 13/00* | (2006.01) | |
| *A46B 13/02* | (2006.01) | |
| *A46B 15/00* | (2006.01) | |
| *G06F 3/0484* | (2013.01) | |
| *G09B 19/00* | (2006.01) | |
| *G06F 3/0488* | (2013.01) | |
| *A47K 7/04* | (2006.01) | |
| *A46B 9/02* | (2006.01) | |

(52) U.S. Cl.
CPC .......... *G09B 19/0076* (2013.01); *A46B 9/021* (2013.01); *A46B 13/001* (2013.01); *A46B 13/02* (2013.01); *A46B 15/004* (2013.01); *A46B 15/0006* (2013.01); *A46B 15/0044* (2013.01); *A46B 15/0046* (2013.01); *A46B 15/0085* (2013.01); *A47K 7/043* (2013.01); *G06F 3/0484* (2013.01); *G06F 3/0488* (2013.01); *A46B 2200/102* (2013.01)

(58) Field of Classification Search
CPC .......... G06F 3/0484; A61H 2201/5043; A61H 2201/5046; A47K 7/043; A46B 15/0038; A46B 15/0044; A46B 15/0046; A46B 2200/102

See application file for complete search history.

(56) References Cited

U.S. PATENT DOCUMENTS

| | | | | |
|---|---|---|---|---|
| 2010/0281636 | A1* | 11/2010 | Ortins | A46B 9/04 15/4 |
| 2014/0367131 | A1* | 12/2014 | Grez | A46B 13/00 173/6 |
| 2015/0245989 | A1* | 9/2015 | Weck | A61K 8/97 424/727 |
| 2015/0346936 | A1* | 12/2015 | Rodan | G06F 19/3481 715/745 |
| 2017/0049278 | A1* | 2/2017 | Thomassen | A61H 7/005 |
| 2017/0332850 | A1* | 11/2017 | Powell | A47K 7/043 |
| 2017/0367471 | A1* | 12/2017 | Straka | A46B 15/0006 |
| 2017/0367543 | A1* | 12/2017 | Straka | A47K 7/043 |

* cited by examiner

*Primary Examiner* — Priyank J Shah

(74) *Attorney, Agent, or Firm* — Oblon, McClelland, Maier & Neustadt, L.L.P.

(57) ABSTRACT

A method for controlling display of a user interface for optimizing performance in using a personal care appliance is provided including: receiving a user info or regimen; receiving a protocol or routine to use the appliance; receiving an appliance status related to a user's usage of the appliance; comparing the appliance status to a target usage of the appliance in the protocol or routine; and controlling display of an indicator of the user's performance based on the comparison.

15 Claims, 25 Drawing Sheets
(12 of 25 Drawing Sheet(s) Filed in Color)

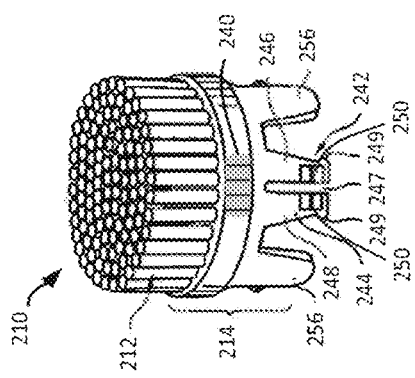
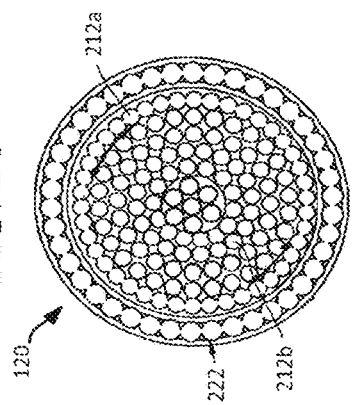
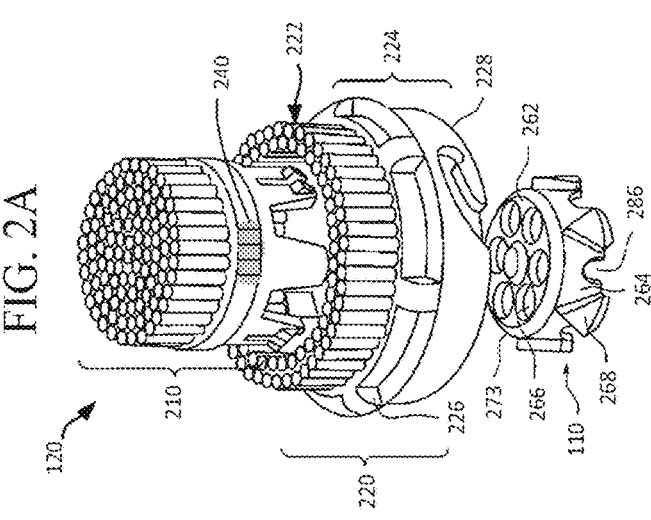

400b

400c

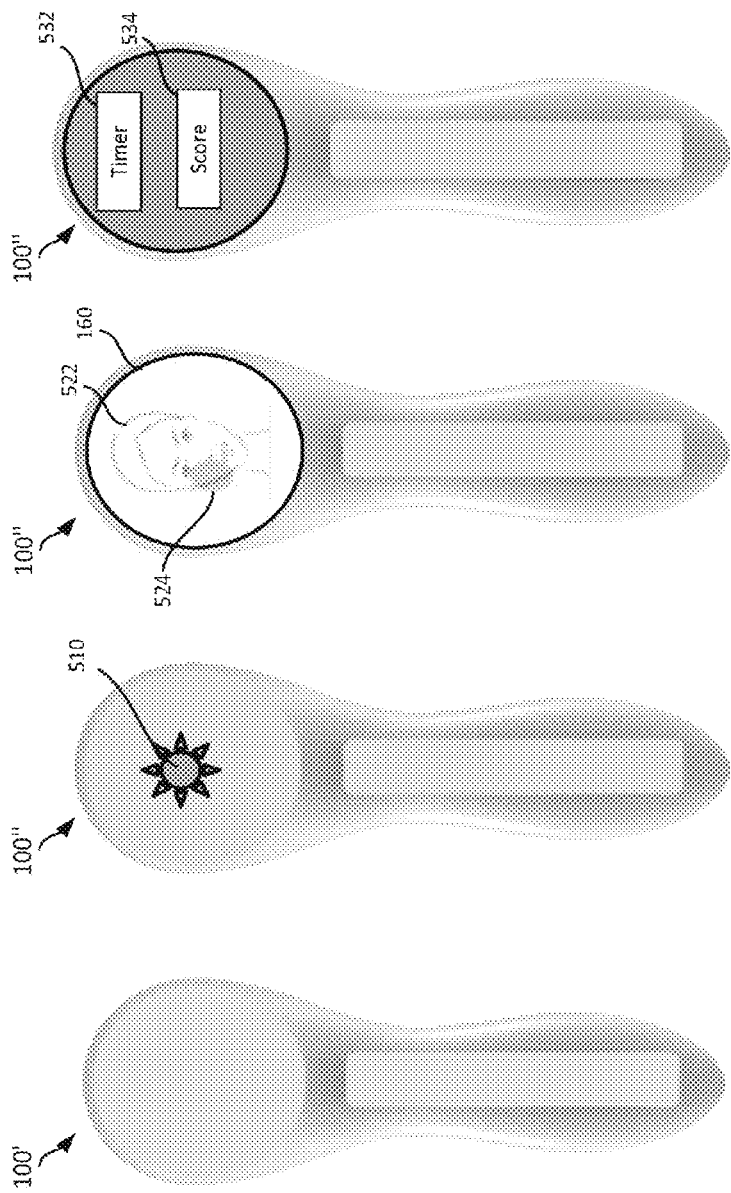

650

USER INTERFACE FOR SYSTEM TO PROMOTE OPTIMUM PERFORMANCE OF HANDHELD COSMETIC DEVICE

BACKGROUND

Field

The present disclosure describes a user interface for a system to promote optimum performance of a personal care appliance for use in skincare.

SUMMARY

In an embodiment, a method for controlling display of a user interface for optimizing performance in using a personal care appliance is provided including: receiving a user info or regimen; receiving a protocol or routine to use the appliance; receiving an appliance status related to a user's usage of the appliance; comparing the appliance status to a target usage of the appliance in the protocol or routine; and controlling display of an indicator of the user's performance based on the comparison.

In an embodiment, the method further includes: controlling display of one or more tutorials based on the target usage of the appliance.

In an embodiment, the method further includes: controlling display of one or more products based on at least one of the user info, the regimen, and the target usage of the appliance.

In an embodiment, the method further includes: transmitting a communication to the appliance to control displaying of an indicator on the appliance.

In an embodiment, the method further includes: calculating a score based on the comparison, wherein the indicator is based on the score.

In an embodiment, the method further includes: storing the appliance status in memory.

In an embodiment, the appliance status is an oscillation of a brushhead.

In an embodiment, the appliance status is a usage history of the brushhead.

In an embodiment, the regimen includes one or more type of brushhead, wherein the protocol or routine to use the appliance is based on the type of brushhead.

In an embodiment, the method further includes: determining the target usage based on the user info or regimen.

In an embodiment, the user info includes an event date.

In an embodiment, the user info includes a location.

In an embodiment, the regimen is based on one or more the protocol or routine to use the appliance.

A system to promote optimum performance of a personal care appliance is provided including: a client device in communication with the appliance; and circuitry configured to: receive a protocol or routine for using the appliance, detect an appliance status, compare the appliance status to the protocol or routine, control display of an indicator based on the comparison.

In an embodiment, circuitry is further configured to transmit a communication to a client device.

In an embodiment, circuitry is further configured to receive a user info or regimen; communicate the protocol or routine to the appliance; and receive an appliance status.

In an embodiment, the appliance status is an oscillation of a brushhead.

In an embodiment, the appliance status is a type of brushhead.

BRIEF DESCRIPTION OF THE DRAWINGS

The patent or application file contains at least one drawing executed in color. Copies of this patent or application publication with colors drawings will be provided by the Office upon request and payment of the necessary fee. A more complete appreciation of the embodiments and many of the attendant advantages thereof will be readily obtained as the same becomes better understood by reference to the following detailed description when considered in connection with the accompanying drawings, wherein:

FIG. 2A shows a perspective view of a brushhead attachment mechanism including a drive hub of the appliance and the brushhead divided into an outer brushhead portion and an inner brushhead portion according to an example;

FIG. 2B shows a perspective view of the inner brushhead portion having a marking according to an example;

FIG. 2C shows a top view of the brushhead portion according to an example;

FIG. 5A shows a drawing of a backside of the appliance according to an example;

FIG. 5B shows a drawing of the backside of the appliance including an indicator according to an example;

FIG. 5C shows a drawing of the backside of the appliance including a display according to an example;

FIG. 5D shows a drawing of the backside of the appliance including a timer and a score according to an example;

DETAILED DESCRIPTION

Figure 1A:
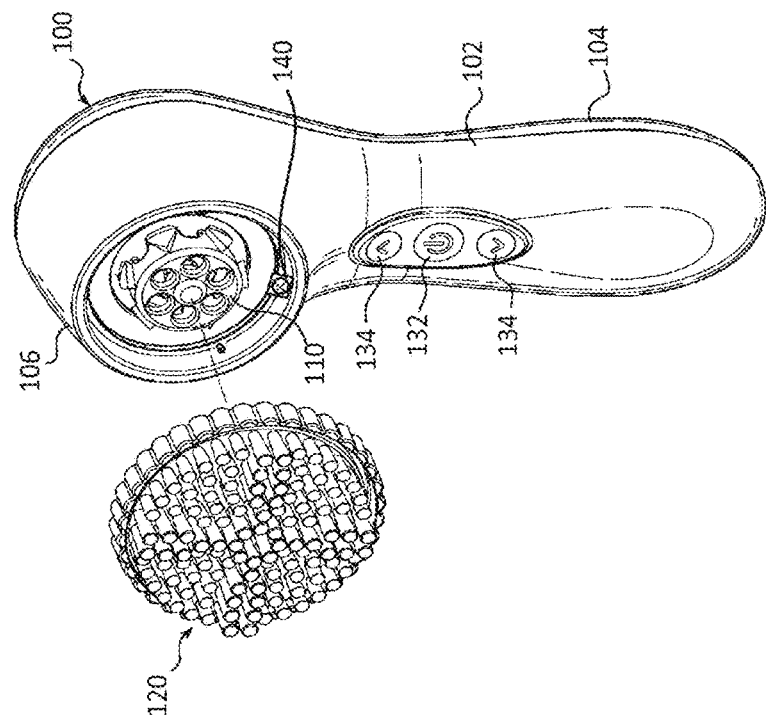
FIGS. 1A-1B show perspective drawings of an appliance having a brushhead and a brush encoder according to an example.

The present disclosure describes systems, methods, and related devices to operation of a personal care appliance. The personal care appliance can be used to perform a routine for skin care of a user. The routine can include one or more regimens, where each regimen has a set of protocols. An example of a protocol includes using a personal care appliance having a brushhead to condition the user's skin by applying a particular brushhead, oscillating at a particular oscillation, to a particular portion of the user's skin for a particular duration.

The disclosed embodiments include a handheld personal care appliance or appliance having a motor assembly for oscillating a brushhead at an oscillation including a frequency and amplitude, and a brush encoder configured to detect the oscillation of the brushhead. The brushhead can have one or more sets of bristles for applying to a person's face or body. An exemplary brushhead for use with a personal care appliance is an exfoliating brushhead for treating a user's epidermis as described in U.S. Pat. No. 9,107,486 incorporated herein by reference. The brushhead can further include a marking or a set of fiducial marks that are detected by the brush encoder. In one example, the set of fiducial marks can be a set of engravings on a part of the brushhead. In an aspect, the marking or the set of fiducial marks can be configured to provide a precision of the amplitude of the oscillation of the brushhead, which are sensed by the brush encoder. In another aspect the marking or the set of fiducial marks can be a barcode used to identify a type of the brushhead such as an acne cleansing brush or an dynamic facial brush.

The brush encoder can be configured to promote optimum performance of the brushhead with the appliance. The brush encoder can be configured to provide calibration data of a part of the appliance or a combination of the appliance with the brushhead during manufacturing as well as prior to use in a regimen. Tracking of the oscillation of the brushhead can be used to coach proper (e.g. as prescribed) usage within a session, as well as monitor goal tracking over a period of time including a prescription or regimen.

In one embodiment, the motor assembly can produce motion at sonic frequencies. The amplitude can be described as a displacement or an angle according to an example. An exemplary device for providing oscillating sonic movement is the Clarisonic brush (Clarisonic, Redmond, Wash.) described in U.S. Pat. No. 7,320,691, incorporated herein by reference in its entirety, which describes an optimal frequency for providing oscillating sonic movement.

In one example, the motor assembly is configured to produce an oscillation frequency of less than 200 Hz. In one example, the motor assembly is configured to produce an oscillation frequency of greater than 10 Hz. The brushhead and the set of bristles can create a second order mechanical dynamic motion.

The motor assembly can have an optimal oscillation frequency unique to each manufactured appliance and in concert with an attached brush or implement. The optimal oscillation frequency can have secondary effects on another appliance part such as the power storage source, the motor assembly, as well as cause heating.

In an example, the brush encoder is configured to track the oscillation of the brushhead by detecting the set of fiducial markings. The brush encoder can be configured to detect or to measure at least one of the frequency, the amplitude of the oscillation of the brushhead according to an example. In an example, the brush encoder can be configured to detect or to measure a phase shift of the frequency of oscillation. The brush encoder can be configured to create a waveform representing the oscillation.

Uses of Brush Encoder Information

In an example the brush encoder can be used to monitor and to test the appliance and the brushhead individually, as well as in their combination. In an example the brush encoder can be used to calibrate the appliance to the brushhead. In an aspect, the brush encoder can be used to tune a part of the motor assembly to oscillate. Further, the brush encoder can be used to monitor a status of a part of the motor assembly. In an example the brush encoder can be used to determine the type of the brushhead. In an example the brush encoder can be used to perform a set of self-diagnostics of the combination of the appliance and the brushhead. An example of a self-diagnostic test is to diagnose or determine when there is a residual formulation on the bristles of the brushhead or to determine a type of the attached brushhead.

In an example the brush encoder can be configured to monitor and to test manufacturing and production of a part of the appliance. In an example, the brush encoder can be interchanged and removably attached to different appliances such that the appliance can be tested.

The disclosed embodiments include use of a central device operating a software application having a set of software modules to promote optimum performance of the appliance. The central device can be in communication with the appliance in a number of ways, including wired, wireless, and through a set of contacts. An example of the central device can be a mobile device running the software application that is configured to be in communication with the appliance. The software application can be configured to receive the oscillation of the brushhead as detected by the brush encoder and to provide feedback to a user.

Referring now to the drawings, wherein like reference numerals designate identical or corresponding parts throughout the several views.

FIGS. 1A-B

Figure 1B:
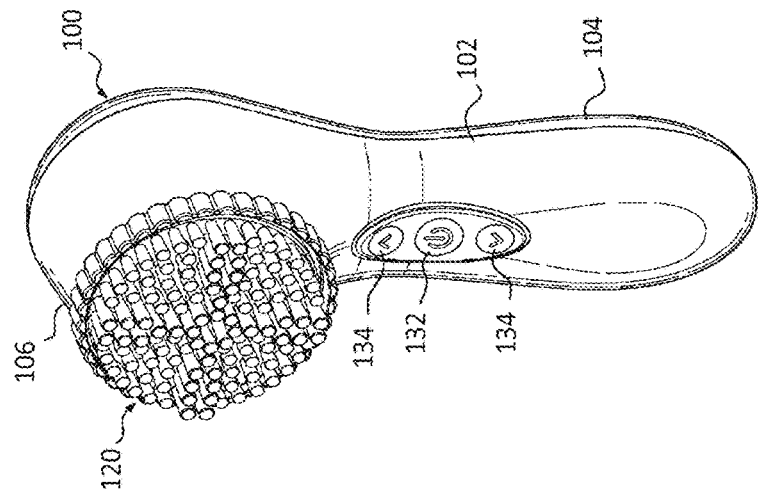

FIGS. 1A-1B show perspective drawings of an appliance 100 according to an example. The appliance 100 includes a body 102 having a handle portion 104 and a head attachment portion 106. The head attachment portion 106 is configured to removeably attach a head, such as brushhead 120, to the appliance 100. As shown in FIG. 1B, the appliance 100 includes a brush encoder 140.

Figure 1C:
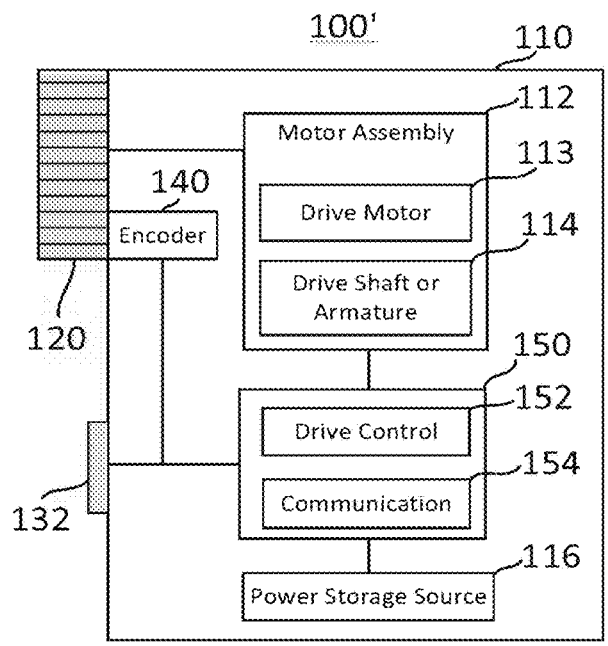
FIGS. 1C-1D show perspective schematic diagrams of the appliance according to an example.

The body 102 houses an operating structure of the appliance 100. As shown in a block diagram form in FIG. 1C, the operating structure in one embodiment includes a motor assembly 112, a power storage source 116, such as a rechargeable battery, and a controller 150. The controller 150 includes a drive control 152 and a communication part 154. In an aspect, the controller 150 can be controlled by on/off button 132 configured and arranged to selectively connect power from the power storage source 116 to the motor assembly 112. The power storage source 116 can be charged by power delivered by a cable connected to the appliance (not shown). In an alternative embodiment the power storage source 116 can be charged by any wireless means including by pLink charging system, inductive Qi charging system and AirFuel. A wireless charging status can be shown as an indicator on the appliance or on the central device (See FIG. 9H).

Figure 6A:
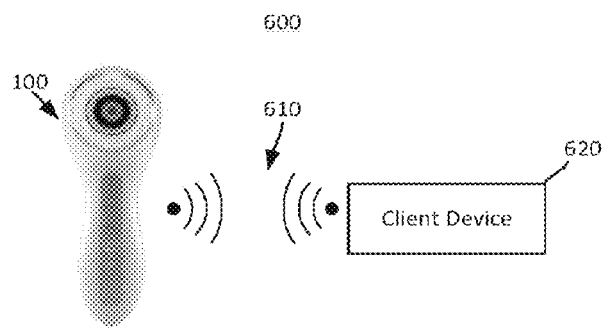
FIG. 6A shows a system to promote an optimal performance of the appliance including the appliance in communication with a central device according to an example.
Figure 6B:
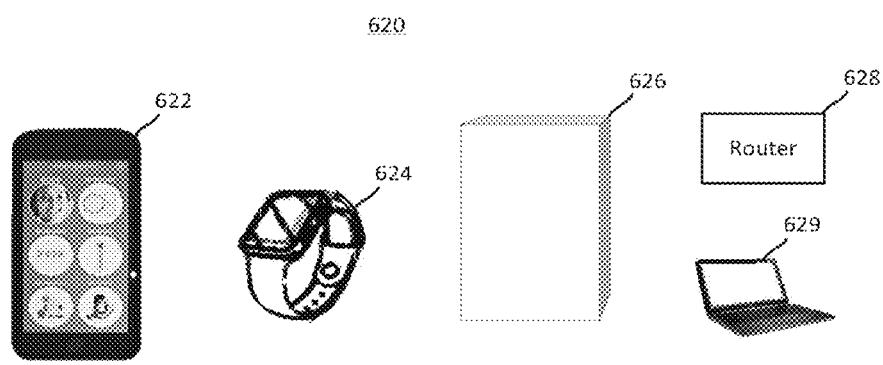
FIG. 6B shows different examples of the central device including a mobile device, a wearable electronic, a television or magic mirror, a personal computer, and a network router according to an example.

In an example the communication part 154 can include circuitry and hardware for communication with a central device 620 (See FIGS. 6A-6B). In an example the communication part 154, or optionally the drive control 152, can include circuitry and hardware for communication with an alert part, an indicator, or a display 160 (See FIGS. 1D and 5B-D). The communication part 154 can include a CPU, a I/O interface, and a network controller such as BCM43342 Wi-Fi, Frequency Modulation, and Bluetooth combo chip from Broadcom, for interfacing with a network. The hardware can be designed for reduced size. For example, the CPU may be an APL0778 from Apple Inc., or may be other processor types that would be recognized by one of ordinary skill in the art. Alternatively, the CPU may be implemented on an FPGA, ASIC, PLD or using discrete logic circuits, as one of ordinary skill in the art would recognize. Further, the CPU may be implemented as multiple processors cooperatively working in parallel to perform the instructions of the inventive processes described above.

In some embodiments, the controller 150 includes a programmed microcontroller or processor, which is configured to control the oscillation of the brushhead by delivery of power to the motor assembly 112. In an aspect, either the drive control 152 or the communication part 154 can include the CPU, memory and store a usage of each brushhead uniquely and by the type of brushhead according to an example.

The motor assembly 112 in some embodiments includes an electric drive motor 113 that drives an attached head, such as the brushhead 120, via a drive shaft or armature 114. When the brushhead 120 is mounted to the head attachment portion 106, the motor assembly 112 is configured to impart motion to the brushhead 120. The motor assembly 112 may be configured to oscillate the brushhead 120 at sonic frequencies, typically in the range of 80-300 Hz, oscillating the brushhead 120 back and forth within a range or amplitude of 3-20 degrees.

The motor assembly 112 may be configured to oscillate the brushhead 120 at a natural resonance or resonant frequency as determined by:

$$2\pi \cdot F = \sqrt{\frac{K}{J}},$$

where K is a system spring rate, J is a oscillating inertia, and F is the resonant frequency in Hertz. Loading the bristles causes a change in the spring rate due to bristle bending and a change in system inertia by removing free bristle tips from an oscillating mass.

In some embodiments, as will be described in more detail below, the brushhead 120 is operated in loaded or unloaded conditions at frequencies from about 40 Hz to 300 Hz with a range of about 3-17 degrees. In other embodiments, the brushhead 120 is operated in a loaded condition at frequencies from about 40 Hz to 300 Hz, a range or amplitude of 8-12 degrees, and a duty cycle of about 38-44%.

One example of a motor assembly 112 that may be employed by the appliance 100 to oscillate the brushhead 120 is shown and described in U.S. Pat. No. 7,786,626, the disclosure of which is hereby incorporated by reference in its entirety. However, it should be understood that this is merely an example of the structure and operation of one such appliance and that the structure, operation frequency and oscillation amplitude of such an appliance could be varied, depending in part on its intended application and/or characteristics of the brushhead 120, such as its inertial properties, etc. In another example, the brushhead encoder can be configured to track linear motion such as in is the Clarisonic Opal™ device (Clarisonic, Redmond, Wash.), which is described by U.S. Patent Application Publication No. 2009/0306577, incorporated herein by reference in its entirety.

In some embodiments of the present disclosure, the frequency ranges are selected so as to drive the brushhead 120 at near resonance. Thus, selected frequency ranges are dependent, in part, on the inertial properties of the brushhead 120.

It will be appreciated that driving the attached head at near resonance provides many benefits, including the ability to drive the attached head at suitable amplitudes in loaded conditions (e.g. when contacting the skin) while consuming the least amount of energy from the power storage source. For a more detailed discussion on the design parameters of the appliance, please see U.S. Pat. No. 7,786,626, incorporated herein by reference in its entirety.

FIG. 1D

Figure 1D:
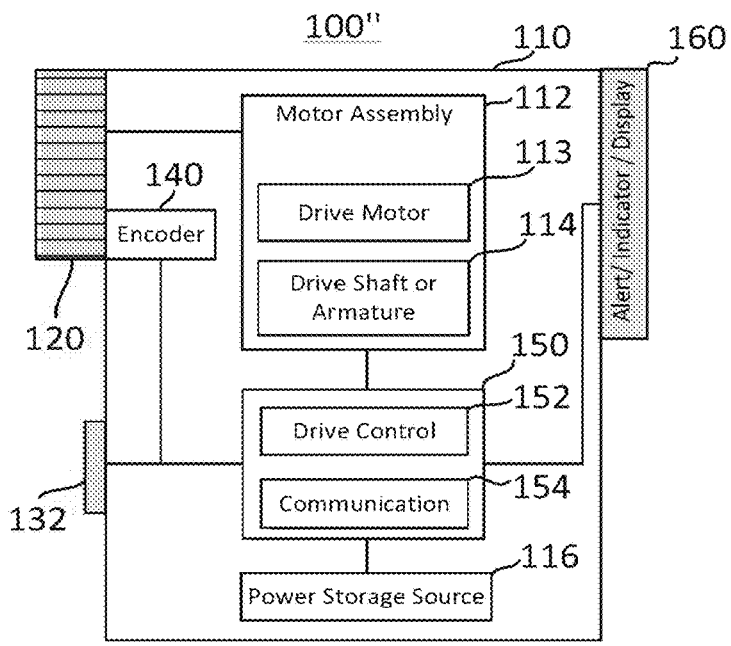

FIG. 1D shows a schematic diagram of an appliance 100" similar to that of appliance 100', further including an alert part, an indicator, or a display 160 according to an example (See FIGS. 5B-5D). The alert part can be configured to give an alert to the user based on the brush encoder 140 or the controller 150. The alert can be a sound, a visual alert, or a vibration or haptic feedback. In an aspect, the indicator and/or the display can be configured to communicate to the user, such as a routine on where and how to use the appliance 100" according to an example. In an aspect, the display can be a touch display and configured to receive input from the user.

A routine can include one or more regimens, where each regimen has a set of protocols. FIG. 9D shows an example of a routine having an event date 901, and a face regimen (See FIG. 9I) with two protocols, one for each type of brushhead. The routine further can include a plan for a number of sessions. The plan can be based on the event date 901 according to an example. Each session can record a score 534 matching the protocol (See FIG. 9C). An example of the score 534 can be based on multiplying the oscillation speed, pressure, and duration with each other. Other regimens include a regimen pedi 840 (See FIG. 9J), a regimen body 842 (See FIG. 9K). As shown in FIG. 9B, a protocol designer 836 can be used to define a regimen with a set of protocols. The regimen can have a protocol name, a type of brushhead, a duration, an applied force and a series of steps including a particular skin region to apply the protocol according to an example.

FIG. 2A

Next, parts of the brushhead are described in different examples. Referring now to FIG. 2A, an brushhead attachment mechanism can include an inner brushhead portion 210, having a marking 240, interfacing with the drive hub 110, which oscillates through a selected angle or amplitude during operation of the appliance 100.

The marking 240 can be a set of fiducial marks that are detected by the brush encoder 140. In one example, the marking 240 can be a printed barcode or a set of engravings on a part of the brushhead. In an example the marking 240 can be a strip sized to cover a desired max angle. In an aspect, the marking 240 can be configured to provide a precision of the amplitude of the oscillation of the brushhead. In an example, the marking 240 can have 294 lines per inch (LPI). In an example each line can be developed by a contact photolithography process and have an accuracy based on a resolution of the contact photolithography process and the brushhead diameter. In an example one or more lines can be based on the oscillation such that they are configured to have an aliasing effect with respect to the oscillation. For instance, when the brushhead is oscillating at a specific frequency, the one or more lines can appear to be still based on a sampling rate of the brush encoder. A precision of the brush encoder can be based on variations of the aliasing effect of the oscillation.

Figure 9A:
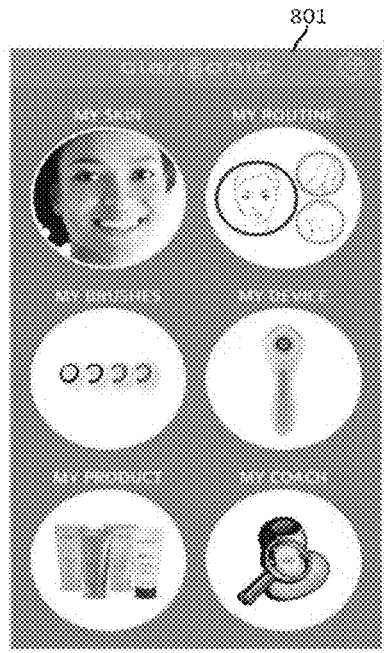
FIGS. 9A-9X show screenshots of examples of the set of software modules implemented on the mobile device according to an example.
Figure 9B:
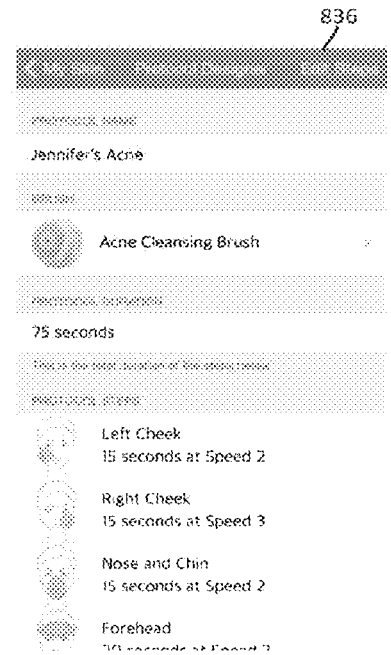
Figure 9C:
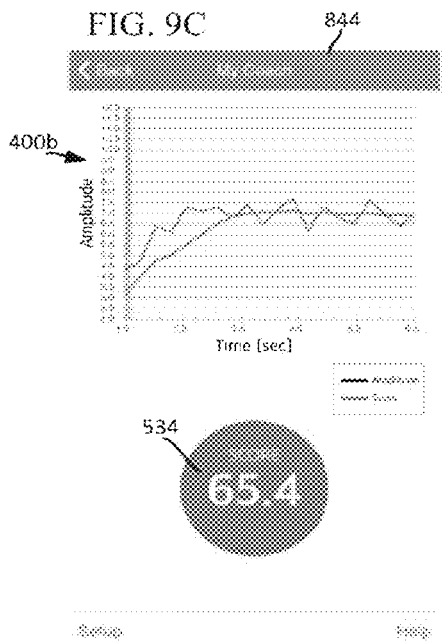
Figure 9D:
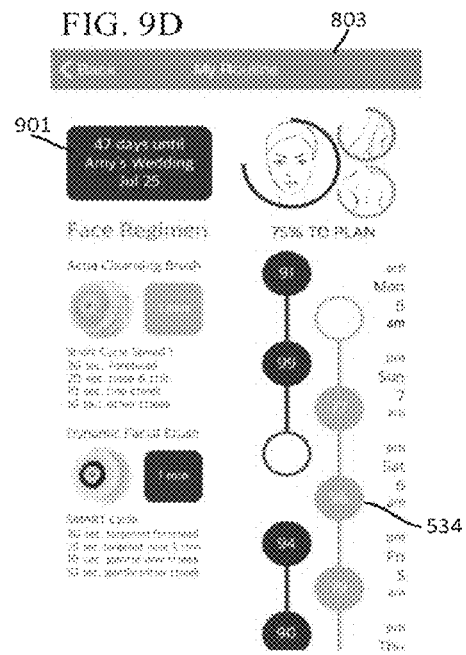
Figure 9E:
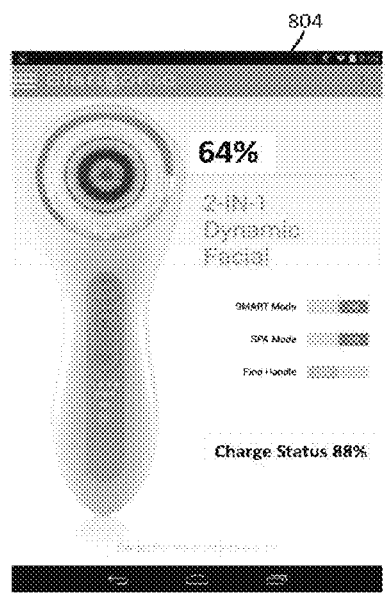
Figure 9F:
Figure 9G:
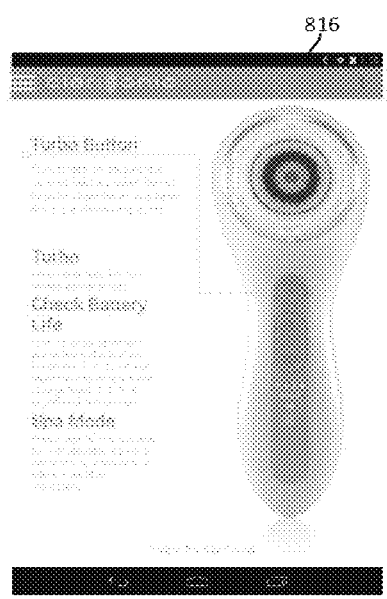
Figure 9H:
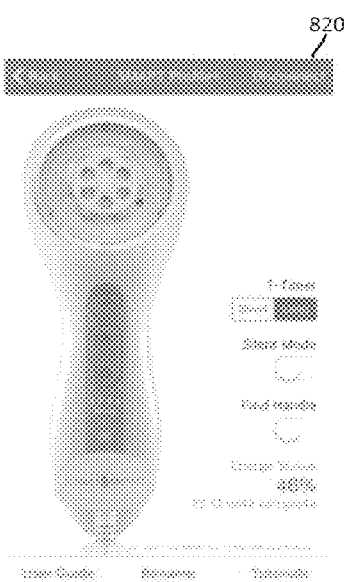
Figure 9I:
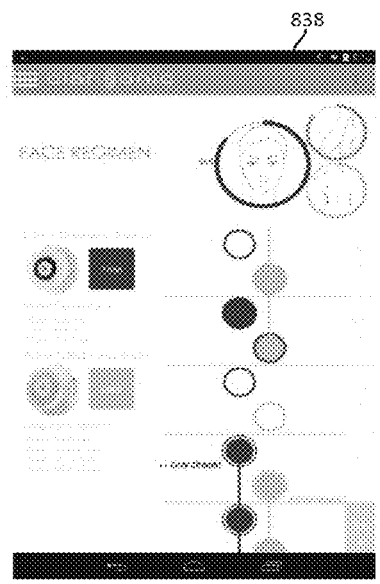
Figure 9J:
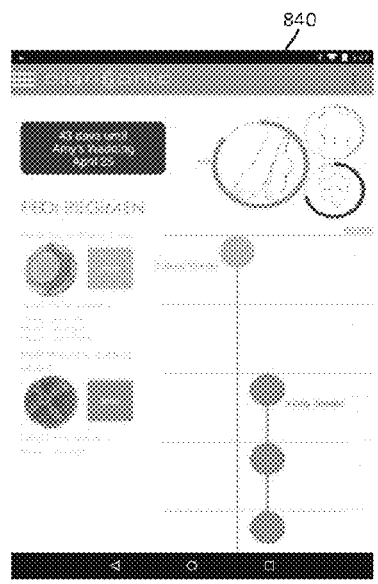
Figure 9K:
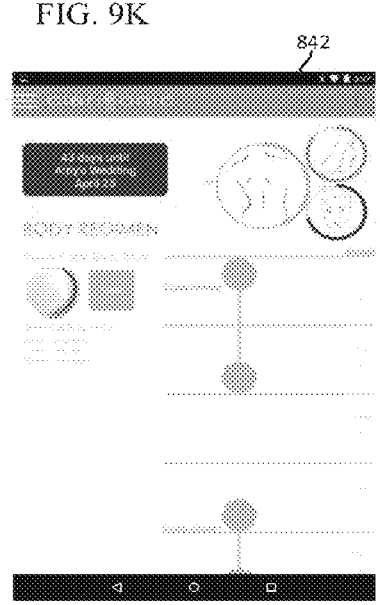
Figure 9L:
Figure 9M:
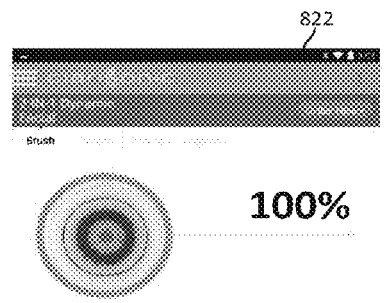
Figure 9N:
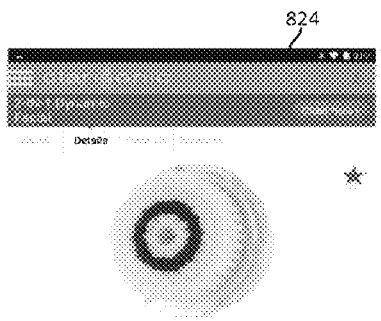
Figure 9O:
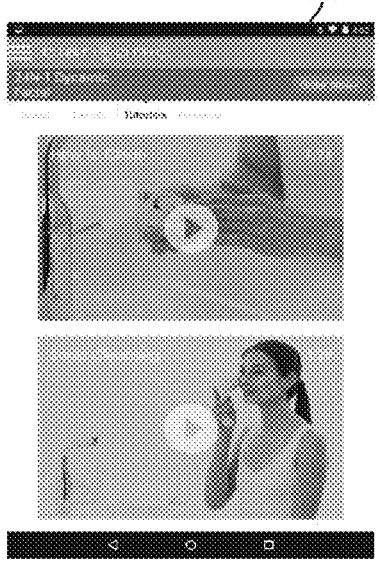
Figure 9P:
Figure 9Q:
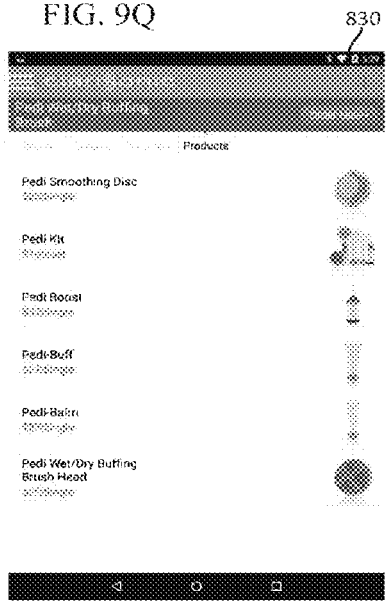
Figure 9R:

In another aspect the marking 240 can be used to identify a type of the brushhead such as an acne cleansing brush or a dynamic facial brush (See FIGS. 9D and 9M). In another aspect the marking 240 can be used to identify the brushhead uniquely. In an example, the marking 240 can include a unique identifier such as a coded serial number separate from the set of fiducial marks. In an embodiment either the brushhead or the marking can include a RFID tag and the brush encoder 140 can be configured to detect the RFID tag and associate a usage history to the brushhead. The brush encoder can include an active RFID reader. The RFID reader can be used to track the position of the RFID tag in an Active Reader Active Tag (ARAT) system, for example. In an example, the usage history of the brushhead is communicated to the user and used to suggest or automatically replenish the brushhead (See FIGS. 9M and 9S).

Figure 3A:
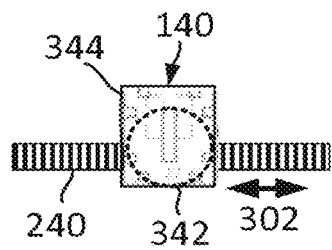
FIGS. 3A-3B are graphics showing an orientation of the brush encoder detecting the marking according to an example.
Figure 3B:
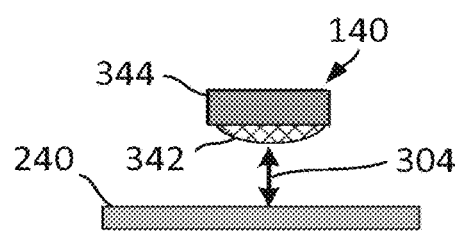

In an example shown in FIGS. 3A-3B, the marking 240 can be a continuous line that meanders with symmetry forming a ruler or a set of identical markings or lines that are identically spaced. In one example, the set of lines of the marking 240 can be configured to have optical contrast as in a barcode for a respective optical brush encoder. In another example the set of lines of the marking 240 can be configured to have a magnetic contrast for a respective magnetic brush encoder. As one skilled in the art would understand, alternate complementary markings or codes, and encoders can be used with the same or different amounts of precision in detecting the oscillation amplitude.

The brush encoder 140 can be a 1-D camera such as a fiducial tracker, an optical encoder such as offered by Frencken Mechatronics, a 3-channel reflective incremental optical encoder such as Avago AEDR-850x by Avago Technologies (San Jose, Calif.), and a custom discrete solution.

The brush encoder is preferably water resistant or configured to be water resistant by packaging for wet brush loading. Alternatively, the brush encoder can be attached to the motor armature such that the brush encoder is contained within the body, making waterproofing unnecessary. In an aspect, the brush encoder 140 can detect the marking 240 with non-optical light such are IR. In an embodiment the brush encoder 140 can detect a mechanical and acoustic vibration of the oscillating brushhead.

Returning to FIG. 2A, the brushhead 120 optionally can include an outer brushhead portion 220, which remains stationary during operation of the appliance 100. In an embodiment shown in FIGS. 2A and 2C, a row(s) of bristle tufts are circular and move in an arcuate manner with an axis of rotation perpendicular to a surface of the skin. FIGS. 2A and 2C show an embodiment in which a set of rows 212 move and an optional set of rows 222 are fixed.

The inner brushhead portion 210 has an operative relationship with the drive hub 110 such that as the drive hub 110 oscillates through a selected angle, so does the inner brushhead portion 210. The outer brushhead portion 220 includes a central, cylindrically shaped opening. The central opening is sized and configured to surround the sides of the inner brushhead portion 210. When attached to the appliance 100, a rim, which extends around the top periphery of the central opening, is flush with or positioned slightly above the outwardly facing surface of the body 102.

In some embodiments, the inner brushhead portion 210 and the outer brushhead portion 220 together include a brushhead attachment mechanism configured to provide selective attachment of the brushhead 120 to the head attachment portion 106 of the appliance 100.

In the embodiment shown, the outer brushhead portion 220 is annular, with an outside diameter of approximately 1.975 inches, with a central opening. The outer brushhead portion 220 includes a base portion 224 with a rim around the top periphery thereof which includes a plurality of spaced finger grips 226, which helps the user in installation and removal of the brushhead 120. The outer brushhead portion 220 can further include a plurality of brushhead bristles 222 which extend upwardly from the base portion 224. There may be a gap or space between the bristles of the inner and outer brushhead portions, in the range of 0.050-0.125 inches, preferably 0.084 inches.

When attached to the appliance 100 by the brushhead attachment mechanism, the following occurs: (1) the inner brushhead portion 210 is operatively connected to the motor assembly 112, for example, via a drive hub 110, in a manner that provides oscillating motion thereto; and (2) the outer brushhead portion 220 fixedly secures the brushhead 120 to the head attachment portion 106 of the appliance 100.

Accordingly, the brushhead attachment mechanism in some embodiments provides a quick and easy technique for attaching and detaching the brushhead 120 to the appliance 100. It will be appreciated that the brushhead attachment mechanism also allows for other personal care heads to be attached to the appliance, and allows for a replacement brushhead 120 to be attached to the appliance 100, when desired. One brushhead attachment mechanism that may be practiced with embodiments of the present disclosure is set forth in U.S. Pat. No. 7,386,906, the disclosure of which is hereby incorporated by reference in its entirety.

It will be appreciated that other brushhead attachment mechanisms can be employed to provide either tooled or tool-less techniques for selectively attaching the brushhead 120 to a personal care appliance, such as appliance 100, in a manner that (1) provides oscillating motion to the inner brushhead portion 210; and (2) maintains the connection between the inner brushhead portion 210 and the motor assembly 112. For example, in some embodiments, the inner brushhead portion 210 includes a coupling interface configured to cooperatingly connect to an oscillating drive shaft or armature, such as armature 114, of an associated motor assembly 112 in a manner that transmits oscillating motion to the inner brushhead portion 210.

The above-described examples of the brushhead 120 can be used to exfoliate skin of a user's epidermis. In that regard, the brushhead 120 is first attached to the appliance 100. Next, if desired, a skin softening agent, such as skin care formula, can be placed on the tips of bristles of a first group of tufts 212.

FIG. 2B

FIG. 2B shows the inner brushhead portion 210 in more detail in according to an example. The inner brushhead portion 210 has a generally circular configuration and is arranged to fit into the central opening of the outer brushhead portion 220.

The inner brushhead portion 210 includes a plurality of inner brushhead bristles 212 which extend upwardly from a base portion 214, with the bristles 212 arranged in a circular pattern covering the entire upper surface of the base portion 214.

The inner brushhead portion 210 in the embodiment shown includes two sets of depending legs on the outer periphery thereof. The first set of three legs 242-242, spaced at 120° intervals, each leg having a pair of snap portions 244 and 246, defined by a slot 247 which extends down the middle of each snap leg 242.

The two snap portions of each snap leg are configured and arranged to slightly flex toward each other during installation of the inner brushhead portion 210 on the drive hub 110, with the outside edges of the free tips of the snap portions 244, 246 having outward bulges 249-249 which snap back (with the snap portions) after they pass over a pointed portion of the drive hub 110, helping to tightly engage the drive hub 110 and retain the inner brushhead portion 210 on the drive hub 110.

The inner brushhead portion 210 further includes a second trio of spaced drive legs 256-256. The drive legs 256 alternate with snap legs 242 around the periphery of inner brushhead portion 210 and are also separated by 120° intervals.

The drive legs 256 taper slightly from their base to their free ends, which are rounded, designed to provide a close tolerance fit between them and the drive hub 110.

The brushhead structure and assembly is described in more detail in U.S. Pat. No. 7,386,906, which is owned by the assignee of the present application and is incorporated herein by reference in its entirety.

FIG. 2C

FIG. 2C shows a top view of the brushhead bristle arrangement according to an example. The plurality of inner brushhead bristles 212 with an outer-most row of bristles 212a. During oscillation, the outer-most row of bristles 212a will have a greater linear amplitude as compared to another row of bristles 212b, approximately according to r·θ, where r is a radius from a center of the brushhead and θ is an angle of oscillation in radians.

The brushhead bristle arrangement shown and described herein, used in the appliance/brushhead disclosed in the above applications is effective for skin cleaning applications, particularly facial skin. The present brushhead bristle arrangement can also be used in other skin care applications, however, as discussed in the above applications, including acne and black head treatment, athlete's foot treatment, callused skin and psoriasis, razor bumps and related skin applications, wound cleansing and treatment of slow or non-healing wounds, scalp cleaning, chemical peel procedures and shaving cream applications. Preferred bristle configurations and arrangements will differ somewhat depending upon the particular application.

FIGS. 2D-2G

Figure 2D:
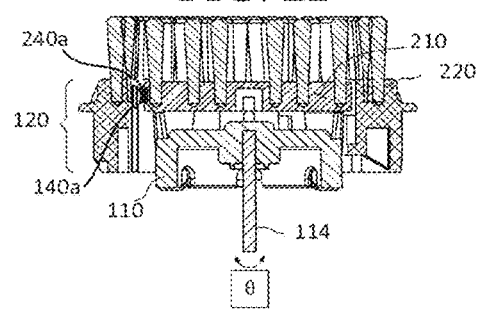
FIGS. 2D-2G each show a cross-section of a brushhead that is positioned on the drive hub and connected to a drive shaft according to an example.
Figure 2E:
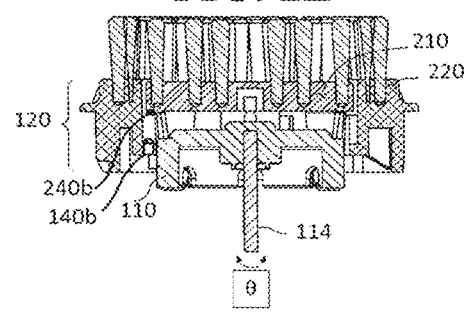
Figure 2F:
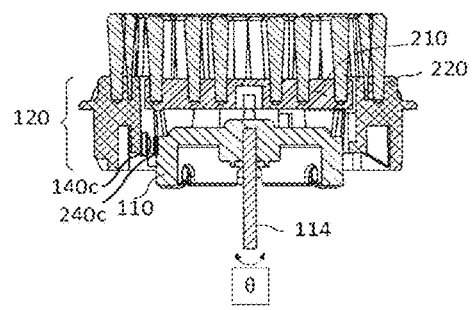

FIGS. 2D-2E show a cross-section of a brushhead (e.g. of FIG. 2A) that is positioned on the drive hub 110 and connected to the drive shaft 114. The brush encoder 140 and the marking 240 are shown in alternate locations in each of the figures. In FIG. 2D, the marking 240a is shown located on an outer surface of the brushhead facing the outer brushhead portion 220, similarly as shown in FIGS. 2A-2B. The brush encoder 140a is positioned on an extension of the appliance in a respective location to detect the marking 240a. In FIG. 2E, the marking 240b is shown on an underside of the inner brushhead portion 210 facing the appliance. The brush encoder 140b is positioned in a respective location to detect the marking 240b. In FIG. 2F, the marking 240c is shown on a side of the drive hub 110. The brush encoder 140c is positioned in a respective location to detect the marking 240c. In an aspect, the brush encoder can be used to monitor a status of a part of the motor assembly 112 such as the connection between the drive hub 110 and the drive shaft 114, which is prone to wear from oscillations of many millions of cycles. In an aspect, the brush encoder can be used to monitor a status of a part of the operating structure such as the power storage source 116 (e.g. battery). One or more markings and brush encoders can be placed at locations to differentiate an appliance status.

Figure 2G:
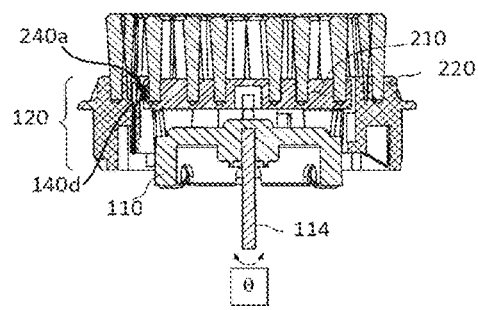

In an embodiment, the brush encoder 140d can be integrated in an outer brushhead portion that further includes a set of electrical connections connecting the brush encoder to the operating structure or circuitry of the appliance (See FIG. 2G). In this example, circuitry can be connections to the controller 150, the drive control 152 or the communication part 154 as in FIGS. 1C-1D. In another embodiment the brush encoder 140 can be integrated in an outer brushhead portion as a separate brush encoder device (See FIG. 6C). In another embodiment, the brush encoder can be integrated into an operating structure of the appliance such that the motion of the internal motor assembly components can be measured and correlated to the brush amplitude.

FIGS. 3A-D

FIGS. 3A-3B are graphics showing an orientation of the brush encoder 140 detecting the marking 240 of the brushhead. FIG. 3A shows the brush encoder 140 overlapping with at least a portion of the marking 240 of the brushhead according to an example. The brush encoder 140 can have a detector part 342 for sensing and a circuitry part 344 for processing and/or transmitting. In FIG. 3A, an outline of the detector part 342 is shown as a dotted circle. In an example, a lens can be further included for enhancing optics of the detector part 342.

FIG. 3B shows a side view of an orientation of the brush encoder 140 detecting the marking 240 of the brushhead, exposing a gap 304 between the brush encoder 140 and the marking 240 of the brushhead according to an example. Here the detector part 342 is shown When in use, either circuitry of the appliance or the circuitry part 344 counts the set of lines and sends out a signal or digital quadrature signal, or similar in function or purpose, Phase A and Phase B (See FIG. 3C) encoding the oscillation or motion 302.

In an example, the brush encoder 140 or the operating structure or circuitry of the appliance can calculate a degree per count (DPC) based on detection of the marking over time. The DPC can be calculated by an equation:

$$DCP = \frac{360°}{LPI \cdot IF \cdot C}$$

where LPI is the lines per inch, IF is an interpolation factor, and C is a circumference of the brushhead. The interpolation factor can account for interpolation between lines which may be performed by the brush encoder to enhance position resolution.

Figure 3C:
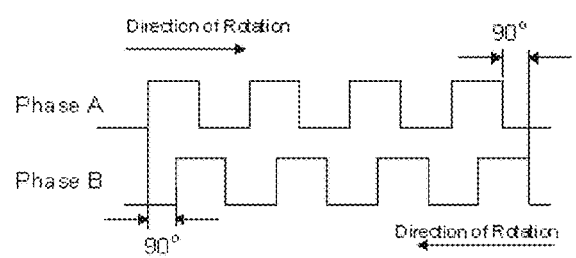
FIG. 3C shows a graphic representing a signal generated by the brush encoder detecting the marking according to an example.

FIG. 3C shows a graphic representing the signal or digital quadrature signal Phase A and Phase B generated by the brush encoder 140 according to an example.

Figure 3D:
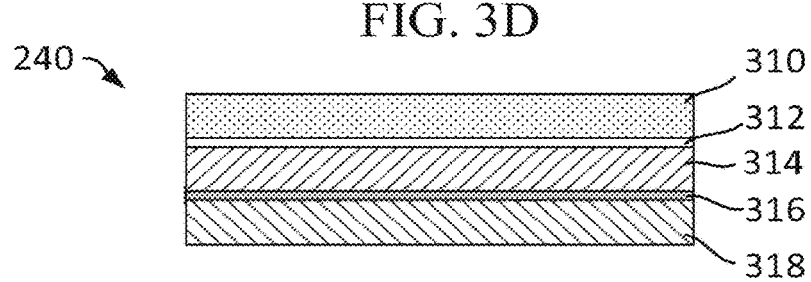
FIG. 3D shows a cross-section of a portion of the marking having multiple layers according to an example.

FIG. 3D shows a cross-section of a portion of the marking 240 having multiple layers according to an example. According to certain embodiments, the marking 240 can be a strip or metalized film that is added to the brushhead. The strip can have different stacked layers serving one or more purposes including adhering and reflecting. In the example shown, the strip can be made of a stack of layers including a poly liner 318, an acrylic pressure-sensitive adhesive (PSA) 316, a reflective aluminum coated polyethylene terephthalate (PET) 314, an optical adhesive 312 such as 3M's 9471LE (St. Paul, Minn.), and a photographic PET film 310. In an example the poly liner 318 can have a thickness on the order of 0.003", the acrylic PSA 316 can have a thickness on the order of 0.001", the reflective aluminum coated PET 314 can have a thickness on the order of 0.003", the optical adhesive 312 can have a thickness on the order of 0.001", and the photographic PET film 310 can have a thickness on the order of 0.004" resulting in a total thickness for the stack of 0.012". Other materials and layer combinations can be used as one skilled in the art will appreciate.

FIG. 4A-C

Figure 4A:
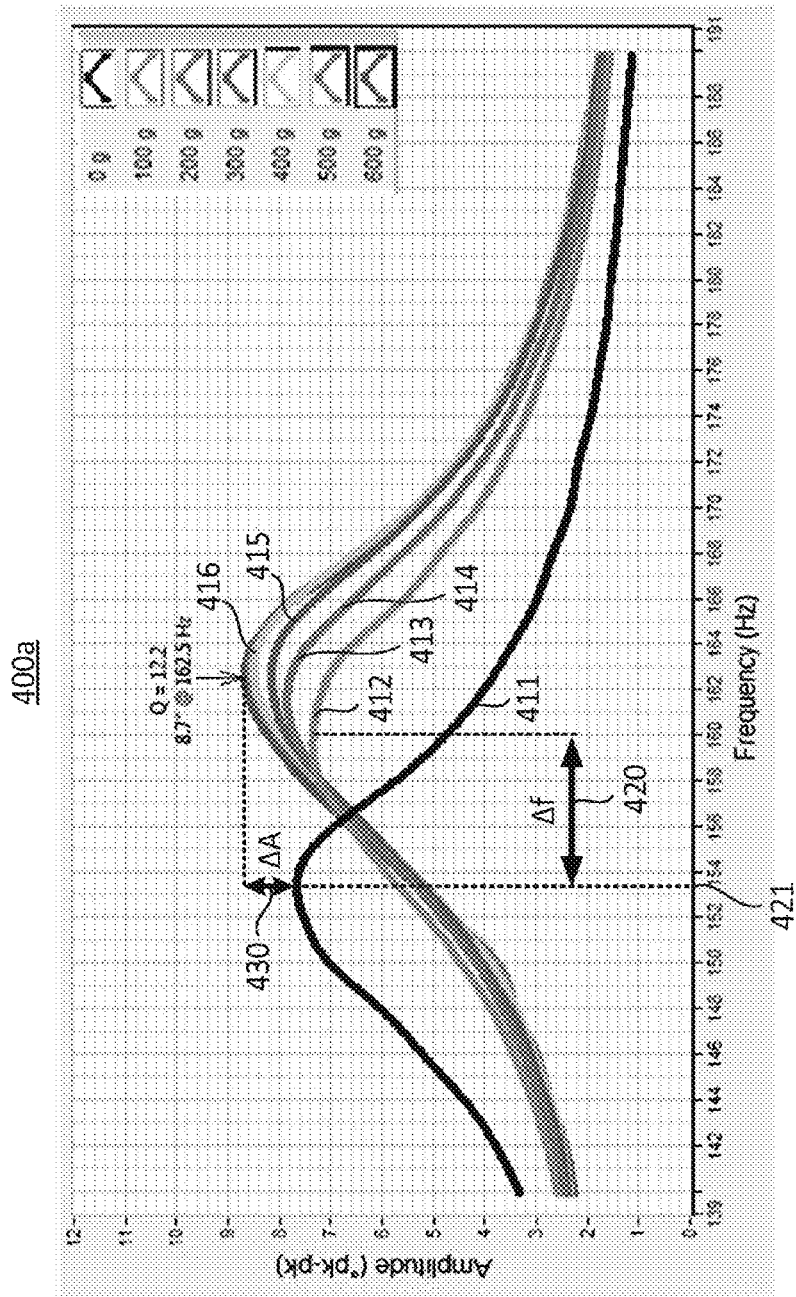
FIG. 4A is a brush oscillation graph showing curves representing an amplitude of oscillation as determined by the brush encoder as a function of a force applied on the brushhead when in use at a certain frequency according to an example.
Figure 4B:
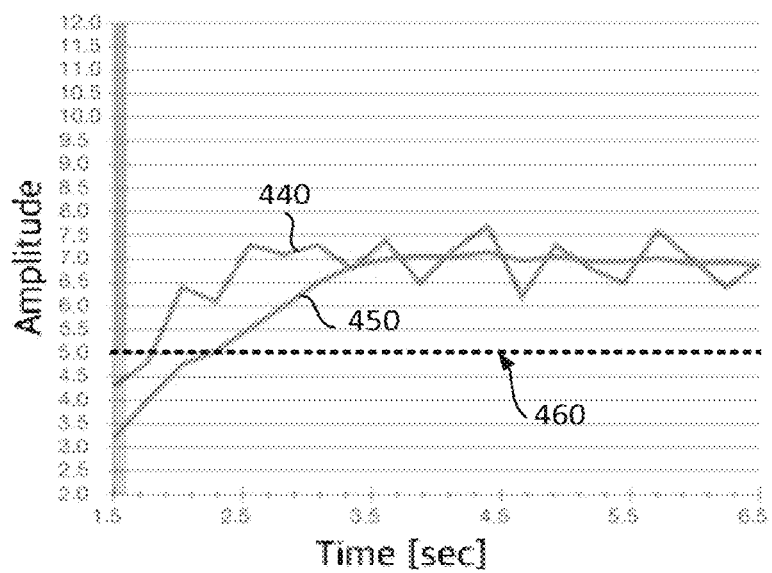
FIG. 4B is a brush oscillation graph showing a first curve representing the amplitude of oscillation determined by the brush encoder as a function of time, a second curve representing a target profile, and a target threshold according to an example.
Figure 4C:
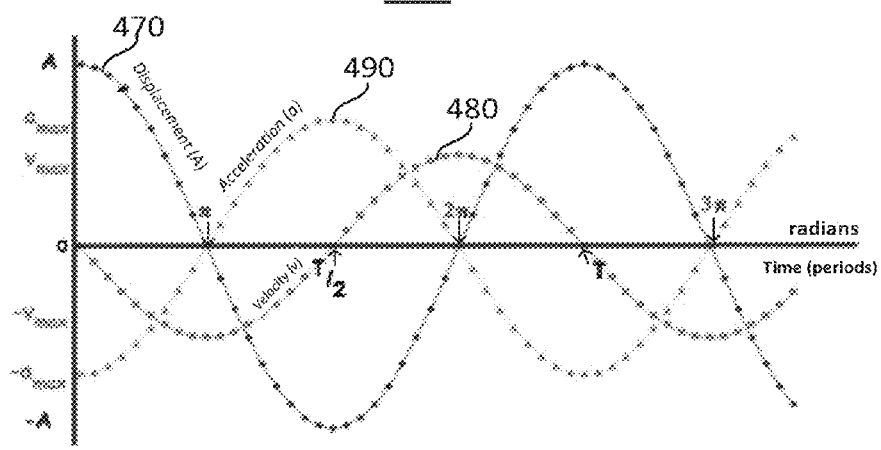
FIG. 4C is a brush oscillation graph showing an oscillation displacement, an oscillation velocity, and an oscillation acceleration over a number of periods of oscillation according to an example.

FIGS. 4A-C show different representations of oscillation attributes that can be correlated with optimal performance of the appliance according to an example. In an aspect, a routine can include a threshold that can be based on an oscillation attribute and configured to trigger the indicator as a protocol of a regimen.

FIG. 4A is a brush oscillation graph 400a showing multiple curves 411-416 representing the amplitude of oscillation as determined by the brush encoder, as a function of a force applied on the brushhead when in use at a certain frequency according to an example.

When the brushhead is not pressed against the user's skin with a force, the brushhead will oscillate at peak amplitude at an unloaded frequency 421.

When the brushhead is pressed against the user's skin with a force, the brushhead can modify (e.g. reduce or increase) the amplitude of oscillation as well as shift the frequency of resonance according to an example. Accordingly, the brush encoder can be configured to detect a change in frequency 420 and a change in amplitude 430 according to an example. In an aspect, when the amplitude of oscillation at the unloaded frequency 421 resembles a characteristically unloaded amplitude, the brush encoder can determine that the appliance is not in usage. Alternatively, the amplitude at a drive frequency can be determined to be characteristic of loaded or unloaded operation.

When the brushhead is pressed against the user's skin with a force greater than a recommended threshold, the appliance 100 can trigger the alert or an indicator (See FIGS. 5A-5D) upon detection of either the change in frequency 420, the change in amplitude 430, or any other change threshold such as a phase change. Brush encoder data can be used to maintain a target amplitude over various load conditions by dynamically adjusting the drive frequency or duty cycle.

FIG. 4B is a brush oscillation graph 400b showing a first curve representing the amplitude of oscillation 440 determined by the brush encoder as a function of time, a second curve representing a target profile 450, and a target threshold 460 according to an example. In an example, the target profile 450 can be a duration where the amplitude of oscillation 440 is above the target threshold 460. In an aspect, when the frequency of oscillation is the unloaded frequency 421, as shown in the brush oscillation graph 400a (See FIG. 4A) the duration of the amplitude of oscillation 440 can be paused. In another embodiment, an appliance having another input such as a pressure sensor can also be used to pause the duration of the amplitude of oscillation 440.

FIG. 4C is a brush oscillation graph 400c showing a set of curves representing a oscillation displacement (m) 470, a oscillation velocity (m/s) 480, and a oscillation acceleration (m/s²) 490 over a number of periods of oscillation. In an example the curves can have different scales in the y-axis.

FIGS. 5A-D

FIGS. 5A-5D show drawings of alternate examples of a backside of the appliance 100. According to different embodiments, the appliance 100 can have one or more indicators and displays 160. FIG. 5A shows an embodiment of the backside of the appliance 100' having no additional features. FIG. 5B shows an example of the backside of the appliance 100" having at least one indicator 510. Each indicator 510 can have one or more LEDs or light emitting colors and shapes which can be configured to indicate triggering of the alarm. FIG. 5C shows an example of the backside of the appliance 100" having a display 160. In one example, the display 160 can be a digital screen such as an LCD configured to play videos and tutorials (See FIG. 90) and demonstrate a method of use of the appliance 100" and highlight a target area 524. In another example the display 160 can be a fixed graphic 522 with an indicator 524 illuminating a different part of the fixed graphic 522. In an aspect, the display 160 can be configured to show a reverse image such that an image or graphic will appear correctly in a mirror during use.

FIG. 5D shows an embodiment of the backside of the appliance 100" having the indicator or display as a timer 532 and/or a score 534. Here, the indicator can be made of one or more seven-segment displays (SSD), or seven-segment indicators for displaying decimal numerals. The timer 532 and the score 534 can correspond with the protocol according to an example. For instance, the timer 532 can correspond with a protocol duration of the target profile 450 as in FIG. 4B. In an aspect, the timer 532 and the score 534 can be configured to show a reverse ordering such that they will appear in a correct ordering in a mirror during use.

FIGS. 6A-D

FIG. 6A shows a system 600 to promote an optimal performance of the appliance including the appliance 100 in communication with a central device 620 according to an example. In one example, the system 600 can include the appliance 100 in communication with the central device 620 with a wireless signal 610. The central device 620 can be configured to operate a software application or set of software modules (See FIG. 8) to receive and send communications from and to the appliance 100. In an example, the software application can send a protocol or target profile 450 (See FIG. 4B) to the appliance 100, as well as receive data from the brush encoder to track the usage in realtime.

FIG. 6B shows different examples of the central devices 620 including, a mobile device 622, a wearable electronic 624, a television or magic mirror 626, a network router 628, and a personal computer 629. Examples of the software application configured for the mobile device 622 are shown in FIG. 8. The wireless signal 610 can be any appropriate signal such as an electromagnetic signal including WIFI, Bluetooth, near-field, or any other signal such as optical, and acoustic. Each client device, including the appliance, may communicate with each other through an internet connection via an 802.11 wireless connection to a wireless internet access point, or a physical connection to the internet access point, such as through an Ethernet interface. Each connected device is capable of performing wireless communication with other devices, such as through a Bluetooth connection or other wireless means as well.

Figure 6C:
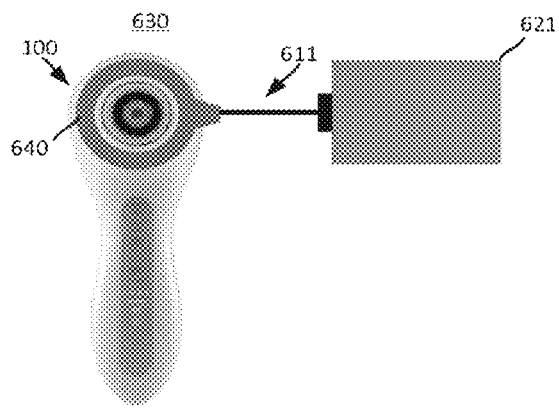
FIG. 6C shows a system including a brush encoder device including an outer brushhead portion having the brush encoder and a peripheral device configured for encoder processing according to an example.

FIG. 6C shows a system 630 including a brush encoder device 640 including an outer brushhead portion having the brush encoder and a peripheral device 621 configured for encoder processing according to an example. The brush encoder device 640 can be connected to the peripheral device 621 by a wireless signal 610 or a wired connection 611. The brush encoder device 640 can be interchanged and removably attached to different appliances such that a series of appliances can be tested with the same brush encoder such as for manufacturing use. Accordingly, the peripheral device 621 can be configured to monitor and to test manufacturing and production of a part of the appliance. The peripheral device 621 can be a computer or a data acquisition device (DAQ) such as mBed LPC1768, and can further connect to a computer operating data acquisition software or other peripheral device. In an aspect, the brush encoder device 640 can be used to test other embodiments of the appliances described here, as well as embodiments of appliances without the brush encoder.

Figure 6D:
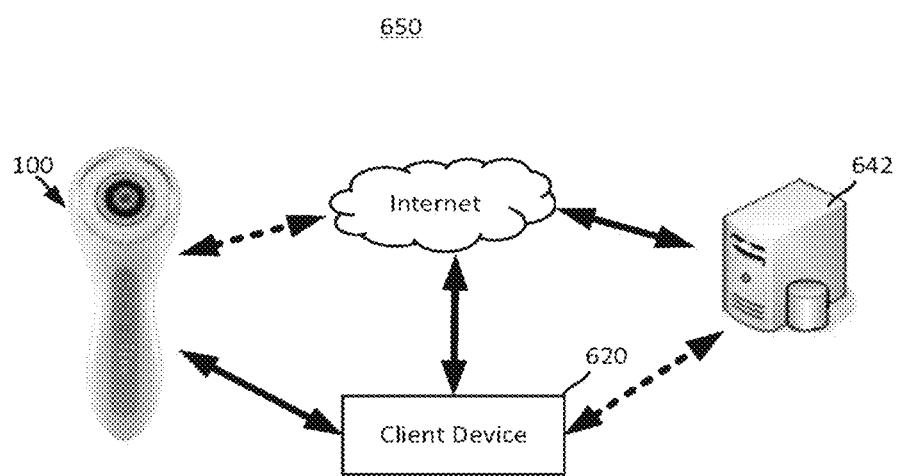
FIG. 6D is a diagram of a system to promote optimum performance of a personal care appliance according to one example.

FIG. 6D is a diagram representing an example of a system to promote optimum performance of a personal care appliance 650, according to one example. The system 640 includes at least the appliance and the peripheral device. Optionally, the system 650 may further include one or more external servers 642 which are implemented as part of a cloud-computing environment and in communication with the system 650 through the Internet. The one or more external servers 642 can store user data, products such as brushheads and formulations, protocols and routines, tutorials, as well as other 3$^{rd}$ party services according to an example.

FIGS. 7A-N

FIGS. 7A-7E are flow diagrams describing methods performed at least in part by the controller 150 to promote an optimal performance of an appliance according to a set of examples.

Figure 7A:
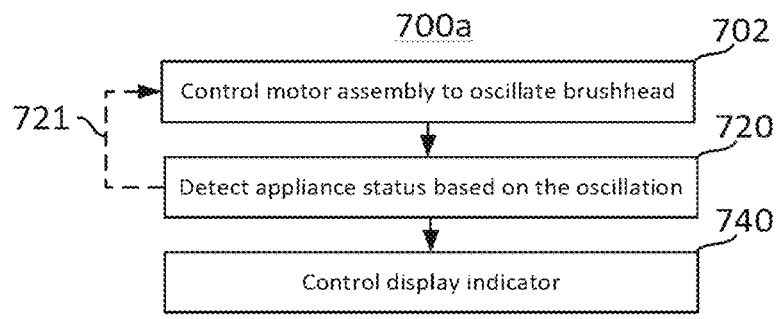
FIGS. 7A-7E are set of flow diagrams describing methods to promote an optimal performance of the appliance according to different examples.

FIG. 7A is a flow diagram describing a method 700a to promote an optimal performance of an appliance according to an example. The method 700a includes steps of controlling the motor assembly to oscillate the brushhead (702), detecting an appliance status based on the oscillation (720), and controlling display of an indicator (740). Optionally, a step 721 of repeating step 702 based on step 720 can be done (i.e. closed-loop control).

Figure 7B:
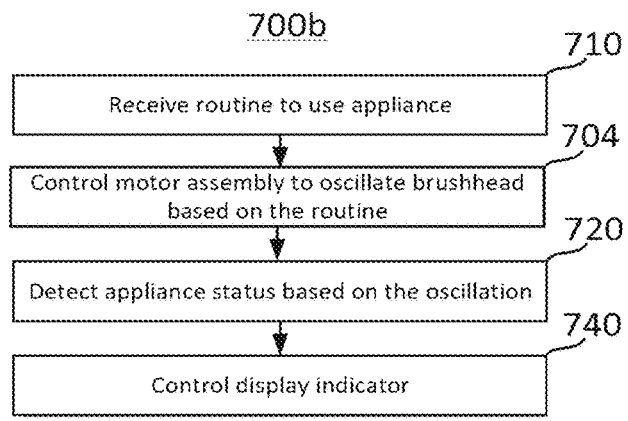
Figure 7C:
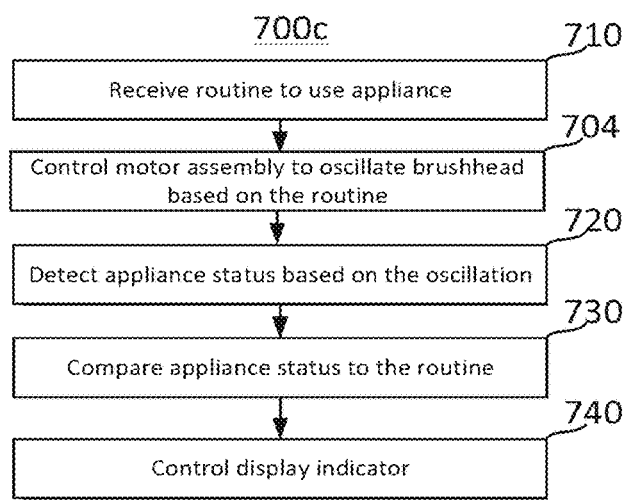
Figure 7D:
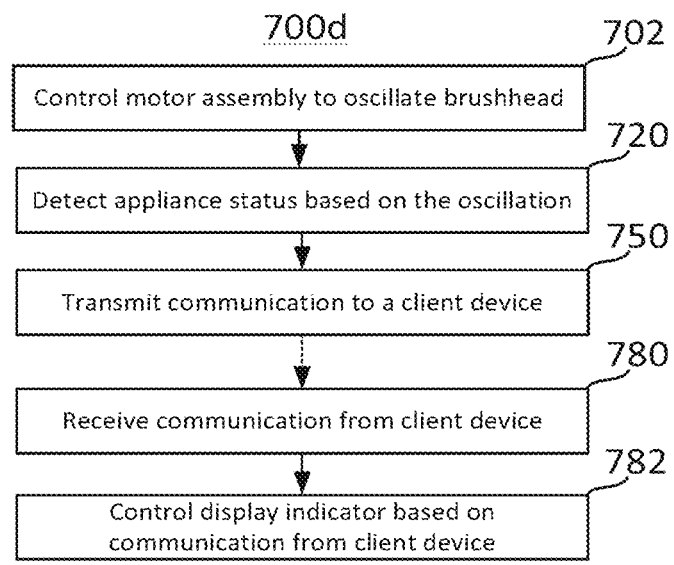
Figure 7E:
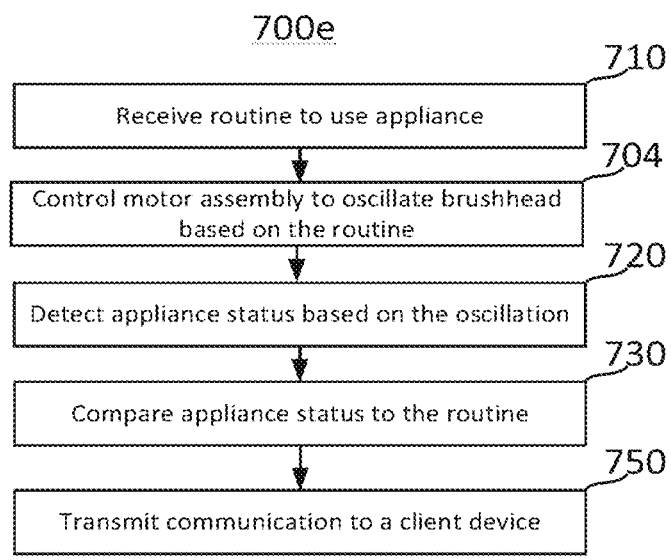
Figure 7F:
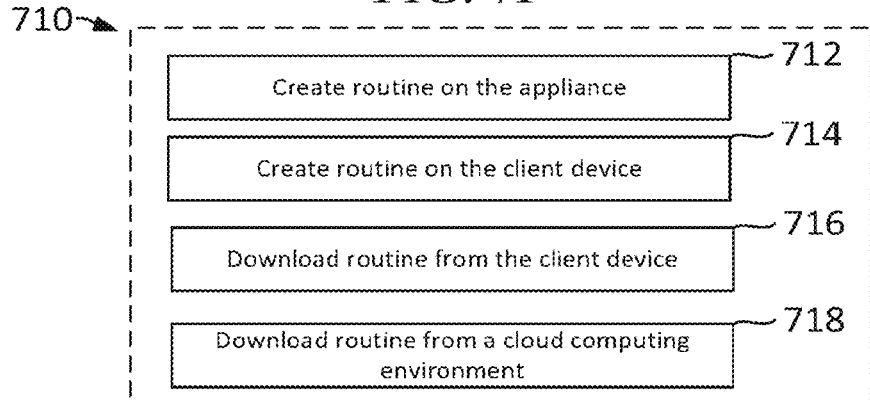
FIG. 7F-7J shows additional aspects related to the set of flow diagrams describing methods to promote an optimal performance of the appliance.
Figure 7G:
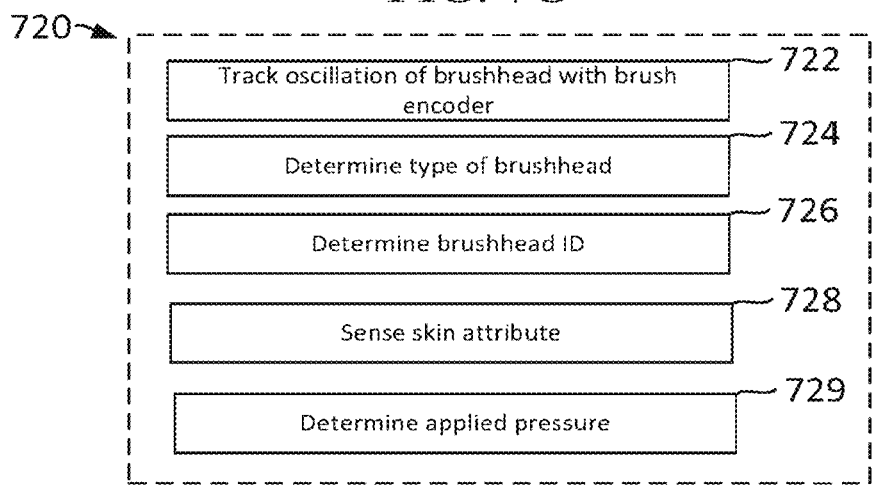

Examples of detecting an appliance status based on the oscillation (720) include tracking oscillation of the brushhead using the brush encoder (722), determining a type of brushhead (724), determining brushhead ID (726), sensing a skin attribute (728), and determining an applied pressure (729) (See FIG. 7G). Other examples of detecting an appliance status based on the oscillation include detecting motor malfunction, presence of impediments or debris around the brushhead and determining an age and wearout status of the brushhead.

Examples of controlling display of the indicator (740) include controlling display of a timer/score (e.g. score 534) indicator (742), controlling display of a pressure indicator (744), controlling display of a brushhead type indicator (746), and controlling display of a brushhead ID indicator (748).

FIG. 7B is a flow diagram describing a method 700b to promote an optimal performance of an appliance according to an example. The method 700b includes steps of receiving a routine to use the appliance (710), controlling the motor assembly to oscillate the brushhead based on the routine (704), detecting an appliance status based on the oscillation (720), and controlling display of an indicator (740). As shown in FIG. 7F, examples of receiving a routine to use the appliance includes creating a regimen or protocol on the appliance (712), creating a regimen or protocol on the client device (714), downloading a regimen or protocol from the client device (716), and receiving an optimized regimen or protocol information from a cloud computing environment based on the user's skin condition (718).

FIG. 7C is a flow diagram describing a method 700c to promote an optimal performance of an appliance according to an example. The method 700c includes steps of receiving a routine to use the appliance (710), controlling the motor assembly to oscillate the brushhead based on the routine (704), detecting an appliance status based on the oscillation (720), comparing the appliance status to the routine (730), and controlling display of an indicator (740).

Figure 7H:
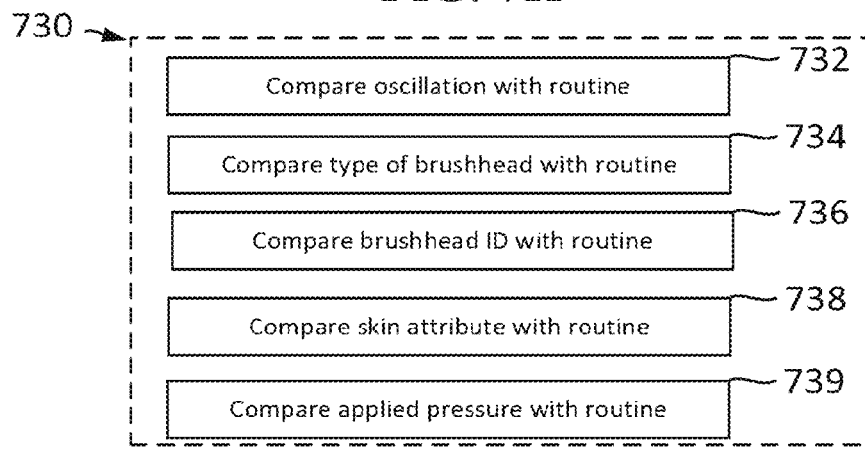

As shown in FIG. 7H, examples of comparing the appliance status to the routine (730) include comparing the oscillation with the routine (732), comparing the type of brushhead with the routine (734), comparing a brushhead ID with the routine (736), comparing the skin attribute with the routine (738), and comparing an applied pressure with the routine (739). The routine can include any aspect of the regimen and the set of protocols. For instance, comparing the oscillation with the routine (732) can include any of the representations of oscillation attributes (See FIGS. 4A-C) corresponding with the set of protocols. In an aspect, the threshold of an oscillation attribute can be compared to the protocol directly or by a conversion. The conversion can be included in the routine.

FIG. 7D is a flow diagram describing a method 700d to promote an optimal performance of an appliance according to an example. The method 700d includes steps of controlling the motor assembly to oscillate the brushhead (702), detecting an appliance status based on the oscillation (720), and transmitting a communication to a central device (750). Optionally, the method 700d further includes steps of receiving communication from the client device (780), and controlling display of an indicator based on the communication from the client device (788).

Figure 7I:
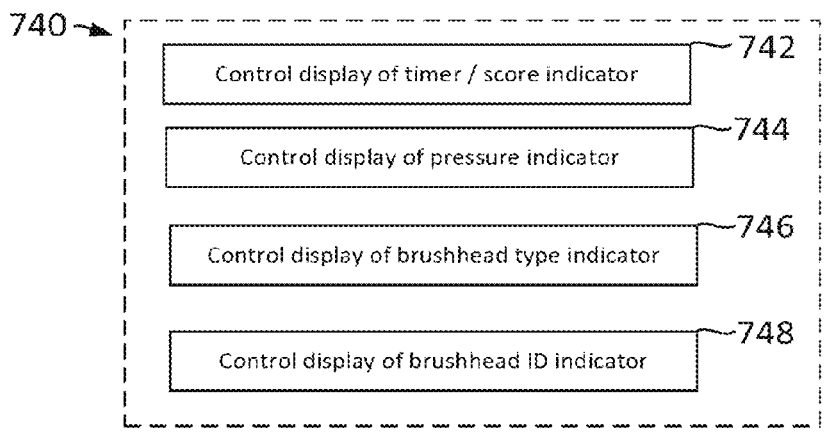
Figure 7J:
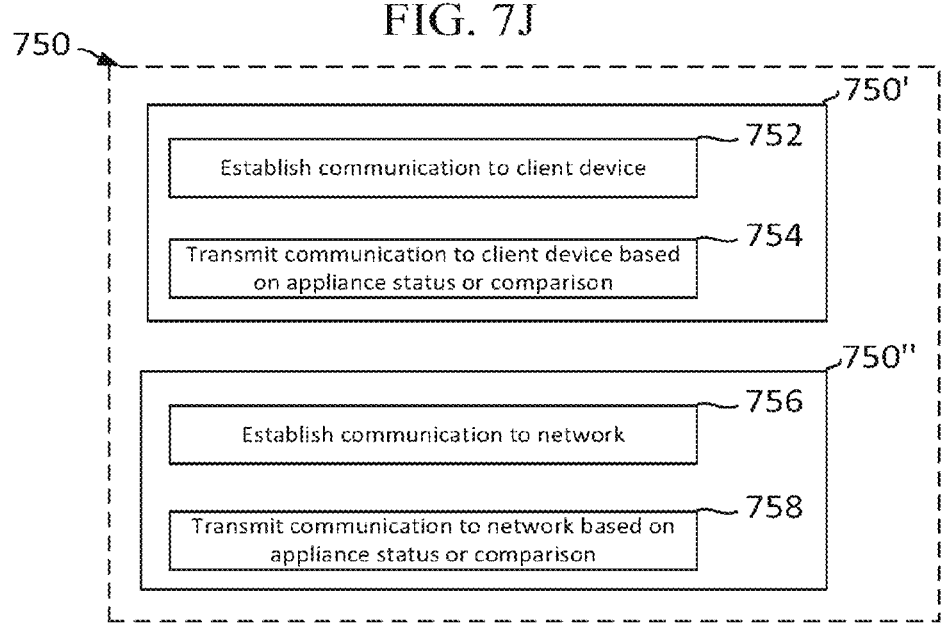

As shown in FIG. 7J, examples of transmitting a communication to a client device (750) includes at least two embodiments. In a first embodiment, the step 750' includes a step of establishing communication to a client device (752), and transmitting a communication to a client device based on the appliance status detected in step 720 or the comparison done in step 730 (754). In a second embodiment, the step 750" includes a step of establishing communication to a network and transmitting a communication to the network based on the appliance status detected in step 720 or the comparison done in step 730 (756). In an example, the step 750" can include transmitting a communication to the network through a network router 628.

FIG. 7E is a flow diagram describing a method 700e to promote an optimal performance of an appliance according to an example. The method 700e includes steps of receiving a routine to use the appliance (710), controlling the motor assembly to oscillate the brushhead based on the routine (704), detecting an appliance status based on the oscillation (720), comparing the appliance status to the routine (730), and transmitting a communication to a client device (750).

Figure 7K:
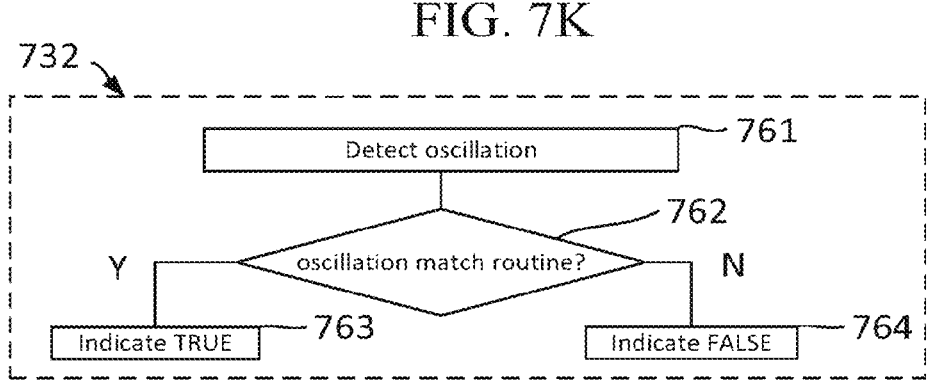
FIGS. 7K-7M show examples of algorithms for performing comparisons of a appliance status with a respective routine.
Figure 7L:
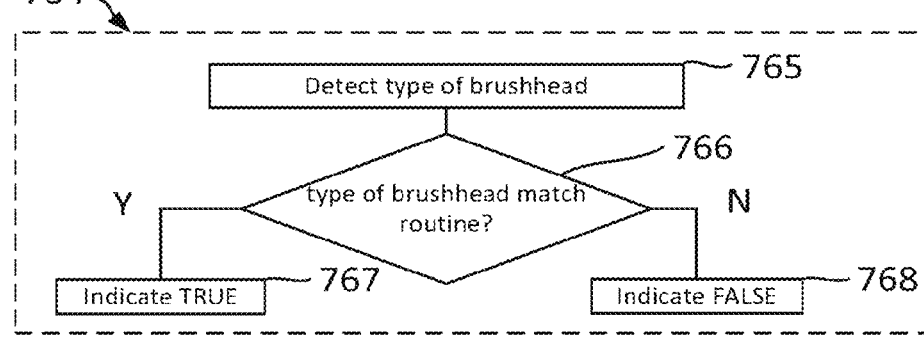
Figure 7M:
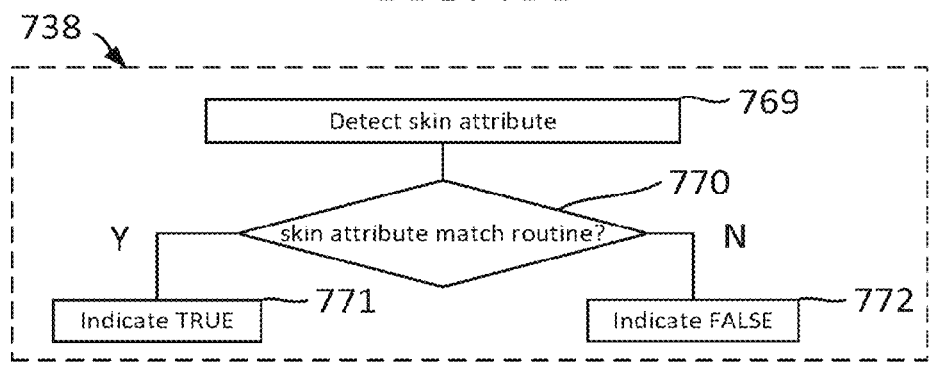

FIGS. 7K-7M show examples of algorithms for performing the comparisons of the appliance status with the respective routine. As shown in FIG. 7K, step 732 comparing the encoded oscillation with a threshold can be done with an algorithm 732, shown as a flow diagram. At step 761 the oscillation is detected and decoded. At step 762 the encoded oscillation is compared to a respective threshold. The respective threshold can be the target threshold 460, the change in amplitude 430, the change in frequency 420, a duration, the oscillation displacement 470, the oscillation velocity 480, and the oscillation acceleration 490. When the oscillation is within the threshold the algorithm 732 returns a true indicator (763). Conversely, when the oscillation is not within the threshold, the algorithm 732 returns a false indicator (764).

As further shown in FIG. 7L, step 734 comparing the type of brushhead with the routine can be done with an algorithm 734, shown as a flow diagram. At step 765 the type of brushhead is detected. At step 766 the type of brushhead is compared to a respective routine. When the type of brushhead matches the routine the algorithm 734 returns a true indicator (767). Conversely, when the type of brushhead does not match the routine, the algorithm 734 returns a false indicator (768).

As further shown in FIG. 7M, step 738 detecting a skin attribute can be done with an algorithm 738, shown as a flow diagram. At step 769 the skin attribute is detected. Skin attributes can include dryness, loss of firmness, rough patches, as well as other attributes related to a dermal condition. At step 770 the skin attribute is compared to a respective routine. When the skin attribute matches the routine the algorithm 738 returns a true indicator (771). Conversely, when the skin attribute does not match the routine, the algorithm 738 returns a false indicator (772).

User Interface Features

The operating system of the client device can have a user interface that is configured to perform multiple functions. In an aspect, the client device can be in communication with a network and enable the user interface access to the Internet as well as Internet of Things (IOT). As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known. In an example, the network can access a server hosting media, protocols, products, personal accounts, stored usage data, and other data related to the appliance, the brushheads, and skin care.

The user interface can display tutorials on how to use the appliance with the type of brushhead. The user interface can create and download protocols for a regimen or routine. The user interface can coach, track usage and compare the tracked usage to the protocol, the regimen, and the routine. The user interface can calculate a score based on the tracked usage. The user interface can store the scores and the tracked usage of each brushhead in memory of the client device. The user interface can be used to make a purchase of a brushhead based on the tracked usage.

FIGS. 8A-G

FIGS. 8A-F are flow diagrams describing a method 850 performed at least in part by a client device to promote an optimal performance of an appliance according to an example.

Figure 8A:
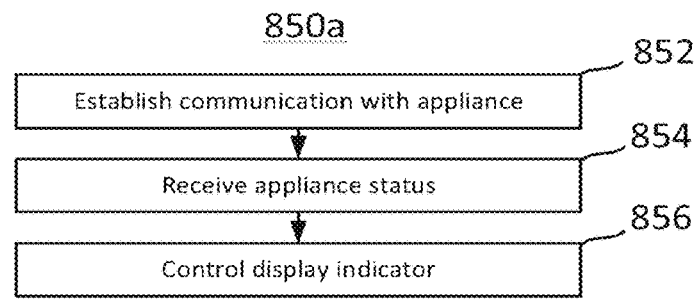
FIG. 8A-8F is a flow diagram describing a method performed on a central device to promote an optimal performance of an appliance according to an example.

FIG. 8A is a flow diagram describing a method 850a to promote an optimal performance of an appliance according to an example. The method 850a includes steps of establishing communication with the appliance (852), receiving an appliance status (854), and controlling display of an indicator (856). The step of receiving an appliance status (854) can be done with respect to step 720 of the method 700d and 700e according to an example (See FIGS. 7D-7E). The step of controlling display of an indicator (856) can be configured to be done similarly on an interface of the client device as for examples of step 740 shown in FIG. 7I.

Figure 8B:
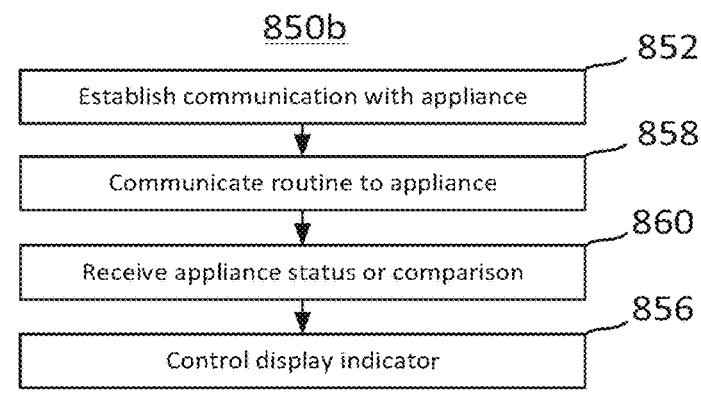

FIG. 8B is a flow diagram describing a method 850b to promote an optimal performance of an appliance according to an example. The method 850b includes steps of establishing communication with the appliance (852), communicating a routine to the appliance (858), receiving an appliance status or a comparison (860), and controlling display of an indicator (856). The step of receiving an appliance status or a comparison (860) can be done with respect to steps 750' and 754 of methods 700d and 700e.

Figure 8C:
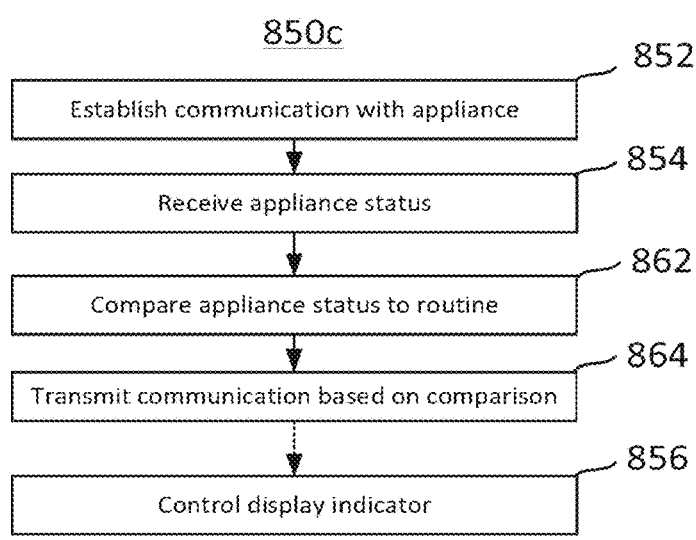

FIG. 8C is a flow diagram describing a method 850c to promote an optimal performance of an appliance according to an example. The method 850c includes steps of establishing communication with the appliance (852), receiving an appliance status (854), comparing the appliance status to the routine (862), transmitting a communication based on the comparison of step 862, and optionally controlling display of an indicator (856). The step of comparing the appliance status to the routine (862) can be done similarly as the examples for step 730 shown in FIGS. 7H, 7K-7M.

Figure 8D:
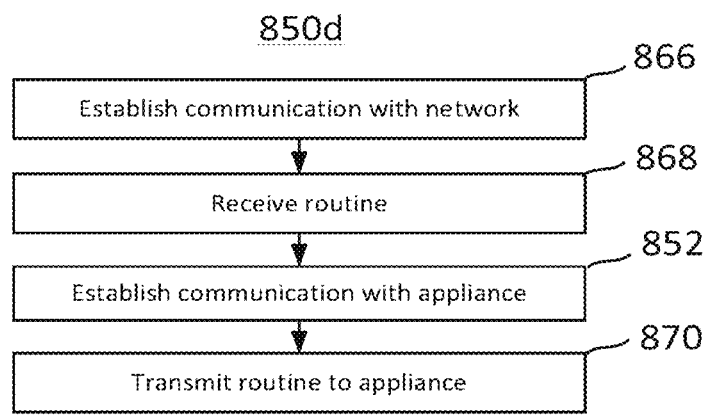

FIG. 8D is a flow diagram describing a method 850d to promote an optimal performance of an appliance according to an example. The method 850d includes steps of establishing communication with a network (866), receiving a routine (868), establishing communication with the appliance (852), and transmitting the routine to the appliance (870).

Figure 8E:
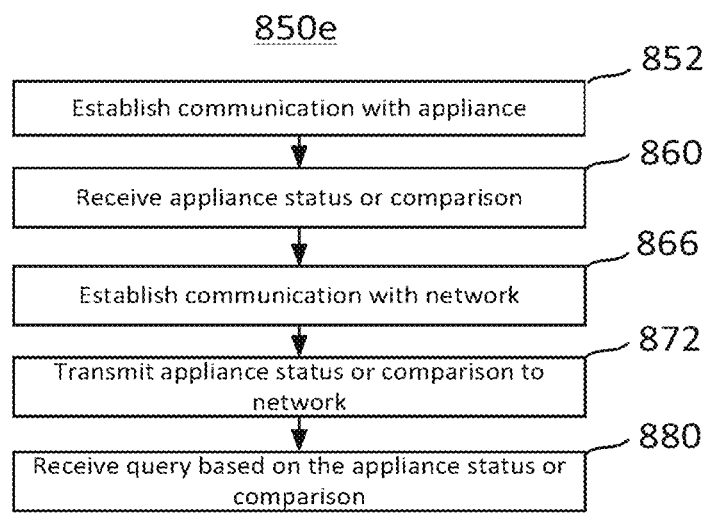

FIG. 8E is a flow diagram describing a method 850e to promote an optimal performance of an appliance according to an example. The method 850e includes steps of establishing communication with the appliance (852), receiving an appliance status or a comparison (860), establishing communication with a network (866), transmitting the appliance status or comparison to the network (872), and receiving a query based on the appliance status or comparison (880). Examples of receiving a query based on the appliance status or comparison (880) include receiving a product list (882), receiving a routine (884), and receiving appliance diagnostics (886), as shown in FIG. 8G.

Figure 8F:
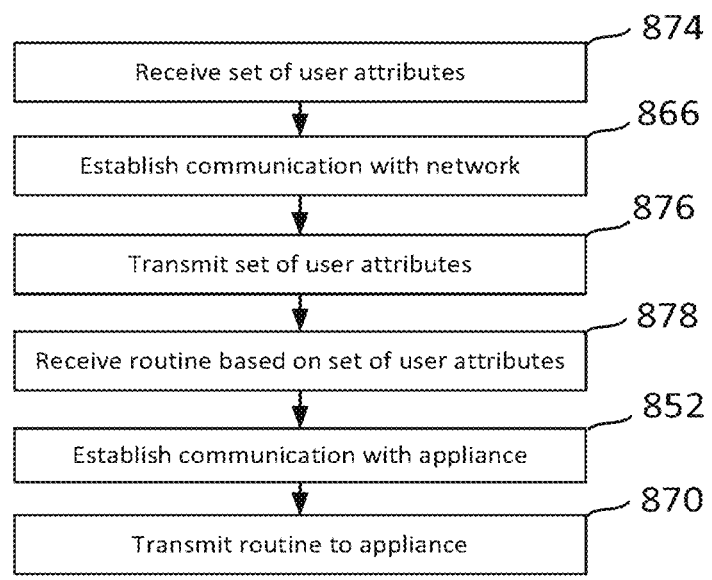
Figure 8G:
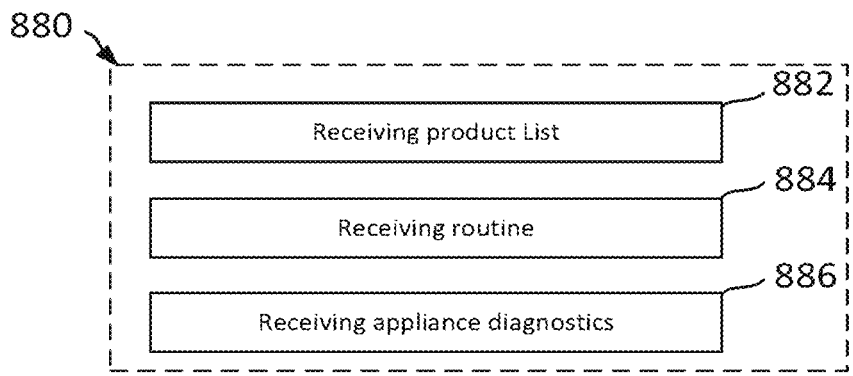
FIG. 8G shows examples of receiving a query based on the appliance status or the comparison.

FIG. 8F is a flow diagram describing a method 850f to promote an optimal performance of an appliance according to an example. The method 850f includes steps of receiving a set of user attributes (874), establishing communication with a network (866), transmitting the set of user attributes (876), receiving a routine based on the set of user attributes (878), establishing communication with the appliance (852), and transmitting the routine to the appliance (870).

The step of receiving a set of user attributes (874) can be done by inputting by the user into the client device 620 or by downloading from a remote server or the appliance. The step of receiving a routine based on the set of user attributes (878) can be done by inputting by the user into the client device 620 or downloaded from a remote server or the appliance. The step of transmitting the routine to the appliance (870) can be done by the wireless signal 610 according to an example (See FIG. 6A).

FIG. 8H

Figure 8H:
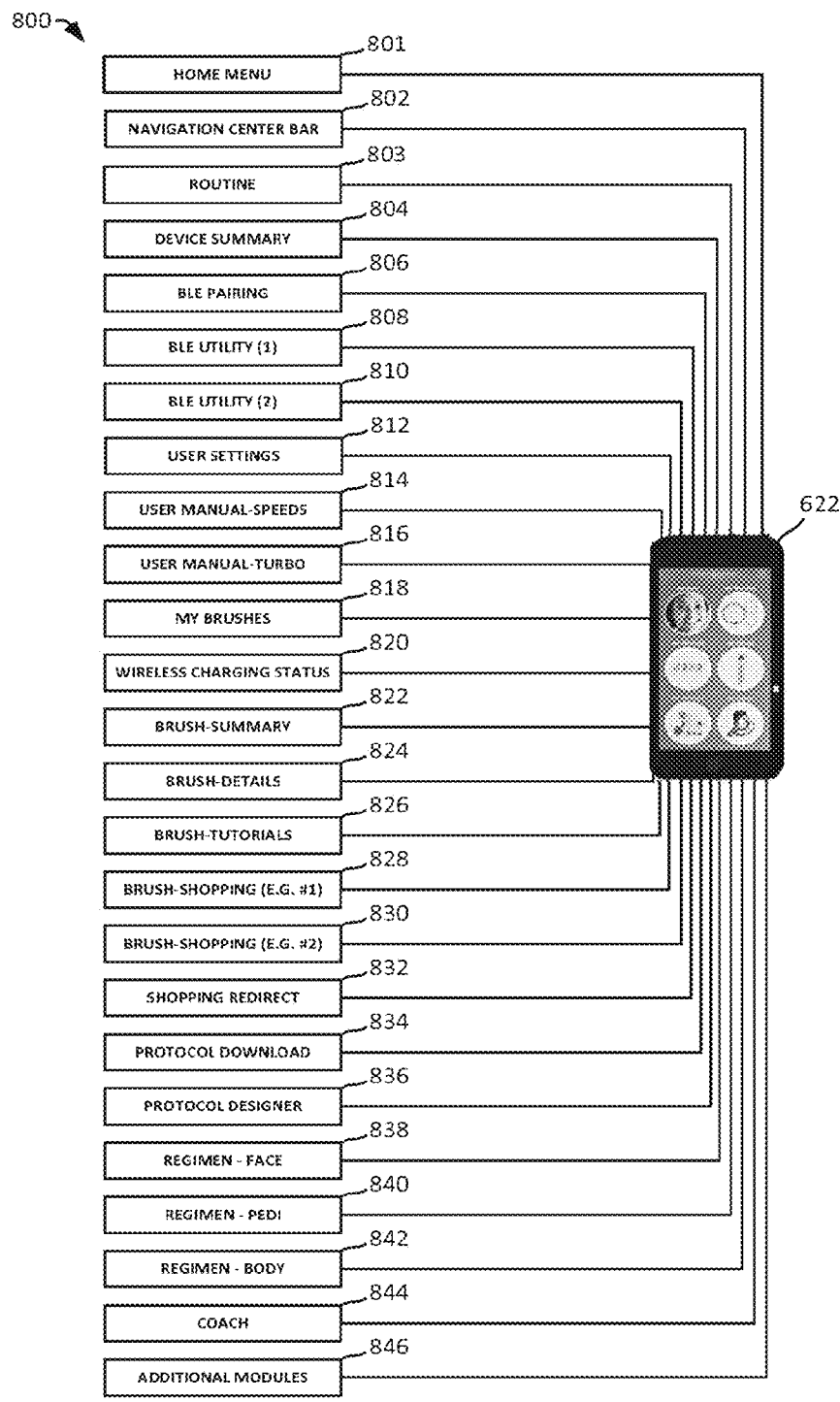
FIG. 8H is a diagram of a computer system having a set of software modules in the central device in the system for promoting optimum performance of the appliance according to an example.

FIG. 8H is an example computer system having a set of software modules 800 in the client device 620 in the system 600. The set of software modules 800 can include one or more of a home menu 801, a navigation center bar 802, a routine 803, a device summary, 804, a Bluetooth Low-Energy (BLE) pairing 806, a BLE utility 808-810, a user settings 812, a user manual 814, a user manual turbo 816, a my brushes 818, a wireless charging status 820, a brush summary 822, a brush details 824, a brush tutorials 826, a brush shopping 828-830, a shopping redirect 832, a protocol download 834, a protocol designer 836, a regimen face 838, a regimen pedi 840, a regimen body 842, a coach 844, and additional modules 846 such as service oriented third party applications can be merged or supplied as add-ins as appropriate.

FIGS. 9A-X

Figure 9S:
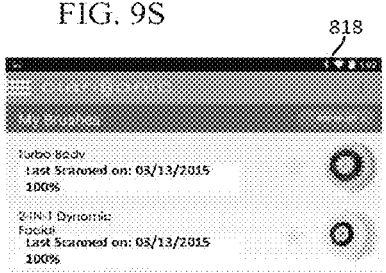
Figure 9T:
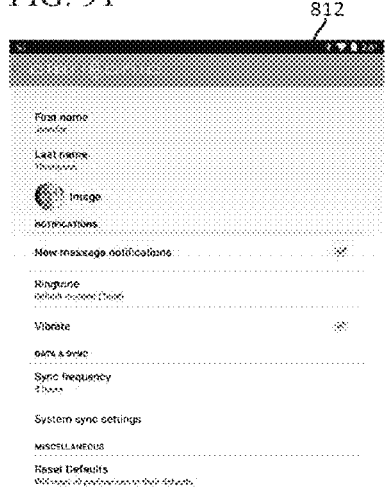
Figure 9U:
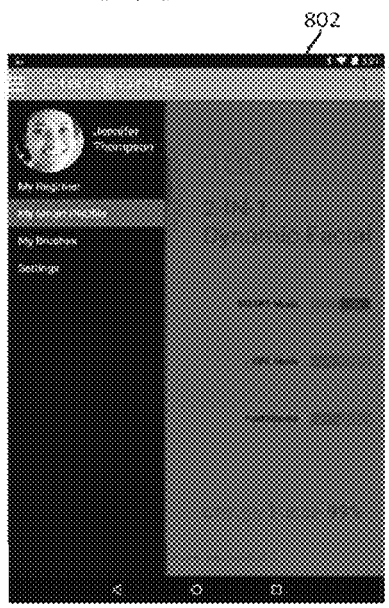
Figure 9V:
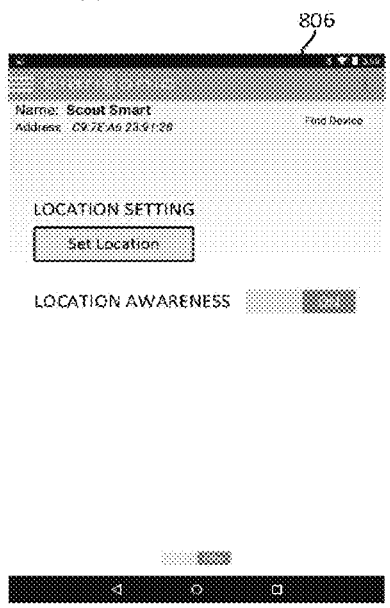
Figure 9W:
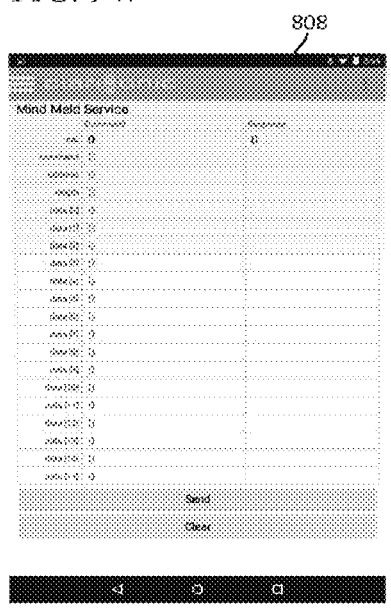
Figure 9X:
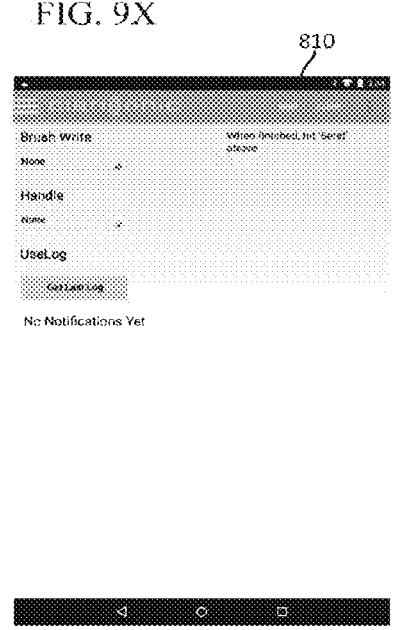

FIGS. 9A-9X show screenshots of examples of the set of software modules 800 implemented on the mobile device 622 according to an example.

As shown in FIG. 9A, the home menu 801 module can be used to navigate to the set of software modules 800.

FIG. 9B shows an example of a custom protocol that will define a behavior of a certain cleansing brush when used by the appliance. As shown in FIG. 9B, the protocol designer 836 module can be configured to allow creation of custom protocols such as a regimen using a particular type of brushhead, for a particular oscillation, a duration, number of steps, as well as conditions for beeps or alarms, target thresholds, etc. In an example, a protocol is a custom brushing mode where a customer can create a user defined brushing routine(s) and where he/she can select a number of brushing segments, duration and brushing intensity (speed) of each segment. In an example the custom protocol can be created on the client device 620 and communicated to the controller 150.

As shown in FIG. 9C, the coach 844 module can include the brush oscillation graph 400b and a cleansing game which can track how well the usage matches the protocol within a session. The brush oscillation graph 400b can show the brush amplitude (≈pressure) in red/yellow/green vs. time over a run cycle according to an example. The cleansing game can show the score 534 according to an example.

As shown in FIG. 9D, the routine 803 module can be used to track the usage as determined in the coach 844 module over multiple sessions according to an example. Obviously, alternate modules can be used to track the usage. The routine 803 module can include a countdown 901 to an event date. FIG. 9D shows an example of a cleansing routine displaying tracked usage compared to recommended usage. FIG. 9I is an alternate view of FIG. 9D.

The my brushes 818 module can track and store the usage of each brushhead uniquely and by the type of brushhead according to an example (See FIG. 9S). The BLE utility 808 can be used for internal purposes and allows engineers or production technicians to control the appliance as well as perform any diagnosis by reading and writing the internal memory of the appliance (See FIG. 9W).

Additional features can be included in further embodiments. In an embodiment, the appliance can have an automated replenishment of the brushheads. In an aspect, the appliance can have a fast charging feature by an inductive Qi or AirFuel (formerly known as A4WP) charging method. In an embodiment, the appliance can have a location awareness such as a location setting (See FIG. 9V), a location provided by the central device 620, or a GPS sensor. The location awareness can be used to create or to modify a regimen. In an example, when the location awareness indicates that the appliance is in a location with harsh weather for the skin, a regimen can be suggested that is appropriate for the user.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for controlling display of a user interface for optimizing performance in using a personal care appliance that includes a brushhead, the method comprising:
    receiving a user information or regimen;
    receiving a protocol or routine to use the appliance;
    receiving an appliance status related to a user's usage of the appliance, the appliance status indicating an applied pressure of the brushhead caused by the user, wherein the appliance status is based on a detected oscillation frequency of the brushhead sensed by detecting an oscillation of a physical marking on the brushhead;
    comparing the appliance status to a target usage of the appliance in the protocol or routine; and
    controlling display of an indicator of the user's performance based on the comparison.

2. The method of claim 1, the method further comprising:
    controlling display of one or more tutorials based on the target usage of the appliance.

3. The method of claim 1, the method further comprising:
    controlling display of one or more products based on at least one of the user information, the regimen, and the target usage of the appliance.

4. The method of claim 1, the method further comprising:
    transmitting a communication to the appliance to control displaying of an indicator on the appliance.

5. The method of claim 1, the method further comprising:
    calculating a score based on the comparison,
    wherein the indicator is based on the score.

6. The method according to claim 5, wherein the score is calculated and the indicator based on the score is displayed within a session in which the user is using the personal appliance.

7. The method of claim 1, the method further comprising:
    storing the appliance status in memory.

8. The method of claim 1, wherein the regimen includes one or more types of brushhead,
    wherein the protocol or routine to use the appliance is based on the type of brush head.

9. The method of claim 1, the method further comprising:
    determining the target usage based on the user information or regimen.

10. The method of claim 9, wherein the user information includes an event date.

11. The method of claim 9, wherein the user information includes a location.

12. The method of claim 9, wherein the regimen is based on one or more the protocol or routine to use the appliance.

13. A system to promote optimum performance of a personal care appliance that includes a brushhead comprising:
  a client device in communication with the appliance; and circuitry configured to:
    receive a protocol or routine for using the appliance,
    detect an appliance status, the appliance status indicating an applied pressure of the brushhead caused by the user, wherein the appliance status is based on a detected oscillation frequency of the brushhead sensed by detecting an oscillation of a physical marking on the brushhead,
    compare the appliance status to the protocol or routine,
    control display of an indicator based on the comparison.

14. The system of claim 13, the circuitry further configured to transmit a communication to a client device.

15. The system of claim 13, the circuitry further configured to
  receive a user information or regimen;
  communicate the protocol or routine to the appliance;
  receive an appliance status.

\* \* \* \* \*